United States Patent [19]

Paveglio, Jr. et al.

[11] 4,250,551
[45] Feb. 10, 1981

[54] METHODS AND APPARATUS FOR LEAD SEGMENT MACHINING

[75] Inventors: Gerald E. Paveglio, Jr., Malone; Lawrence C. Poehlman; Richard L. Werdin, both of Fond du Lac, all of Wis.

[73] Assignee: Giddings & Lewis, Inc., Fond du Lac, Wis.

[21] Appl. No.: 56,728

[22] Filed: Jul. 11, 1979

[51] Int. Cl.³ .............................................. G05B 19/18
[52] U.S. Cl. .................................... 364/474; 82/1 C; 318/569
[58] Field of Search ................. 364/474, 475; 82/1 C, 82/2 B, 5; 318/571, 573, 569, 570, 567, 579

[56] References Cited

U.S. PATENT DOCUMENTS

| | | | |
|---|---|---|---|
| 3,854,353 | 12/1974 | Cutler | 82/1 C |
| 4,019,035 | 4/1977 | Tanner | 364/474 |
| 4,079,235 | 3/1978 | Froyd et al. | 364/474 X |

OTHER PUBLICATIONS

Giddings & Lewis Manuel No. PR-C-UTL-42-04,-"-Vertical Turret Lathe"-Giddings & Lewis Machine Tool Company, Fond du Lac, Wisconsin-1978.

*Primary Examiner*—Joseph F. Ruggiero
*Attorney, Agent, or Firm*—Leydig, Voit, Osann, Mayer & Holt Ltd.

[57] ABSTRACT

Improvements in numerical control systems associated with turning machines and by which a special mode of machining is carried out from those blocks of a part program having a special mode code associated therewith. A lead segment is automatically formed in the workpiece by the special block data from which signals are produced to represent (i) the angular starting location of the lead segment on the workpiece, (ii) the desired lead, and (iii) the ending location of the segment. A lead segment of desired lead and extent may thus be located angularly on a workpiece. A plurality of lead segments, contiguous or separated by zero-lead portions of a composite groove, may be formed circumferentially around the workpiece within an angular span of less than 360 degrees and with its groove portions accurately located in an angular sense.

16 Claims, 15 Drawing Figures

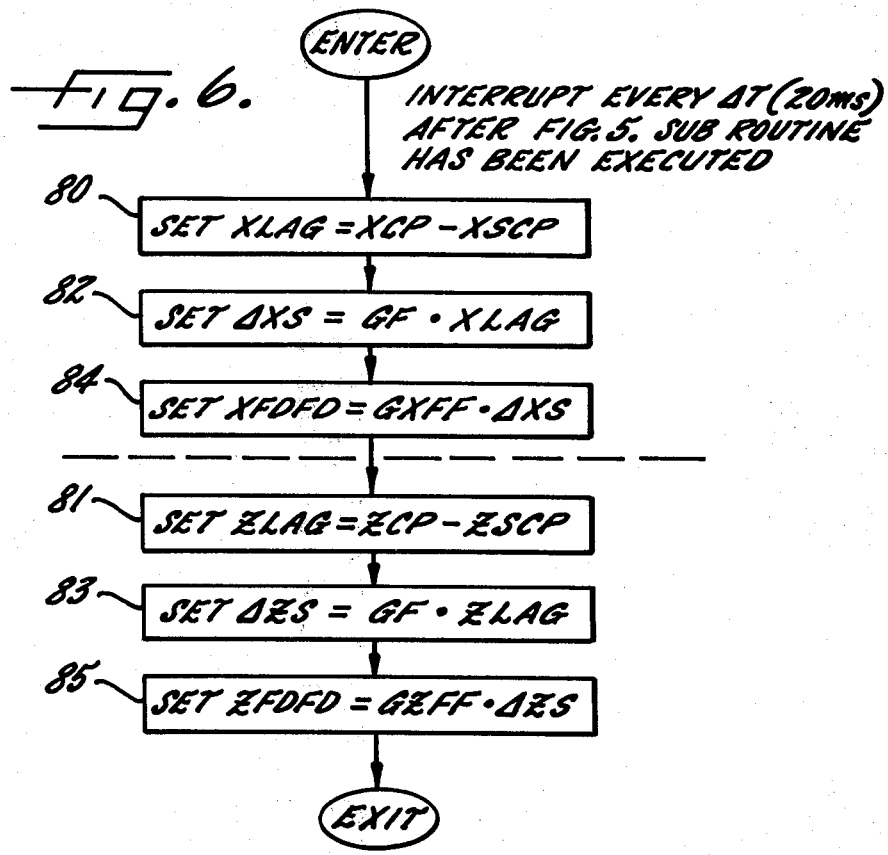
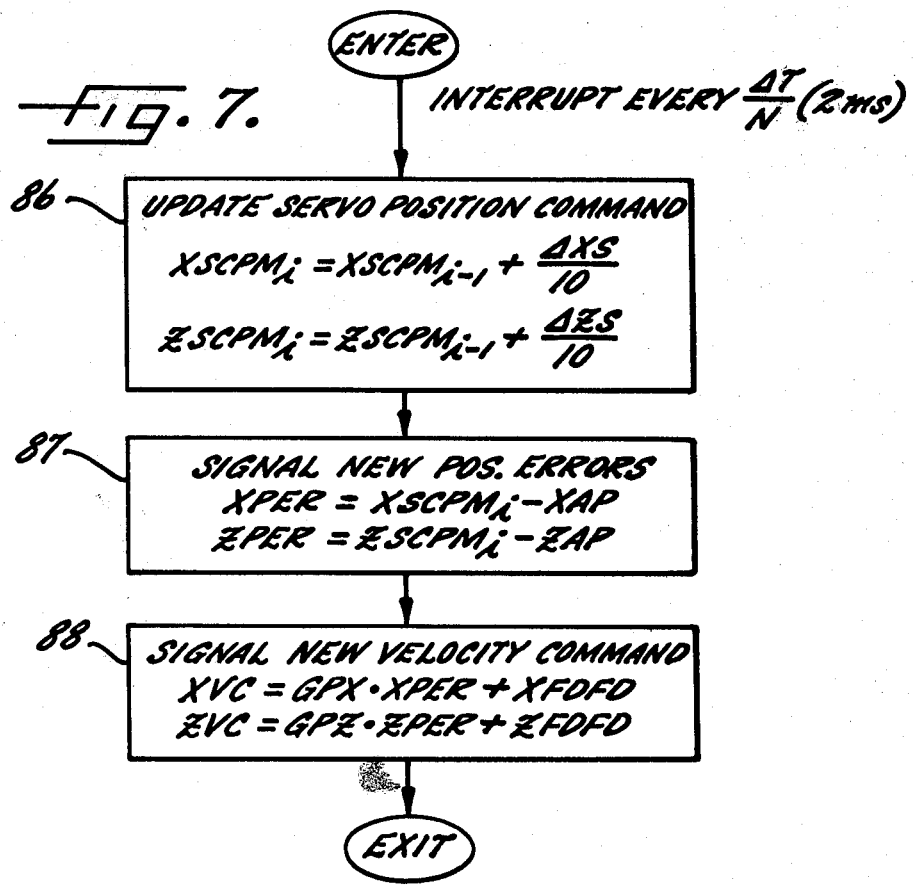

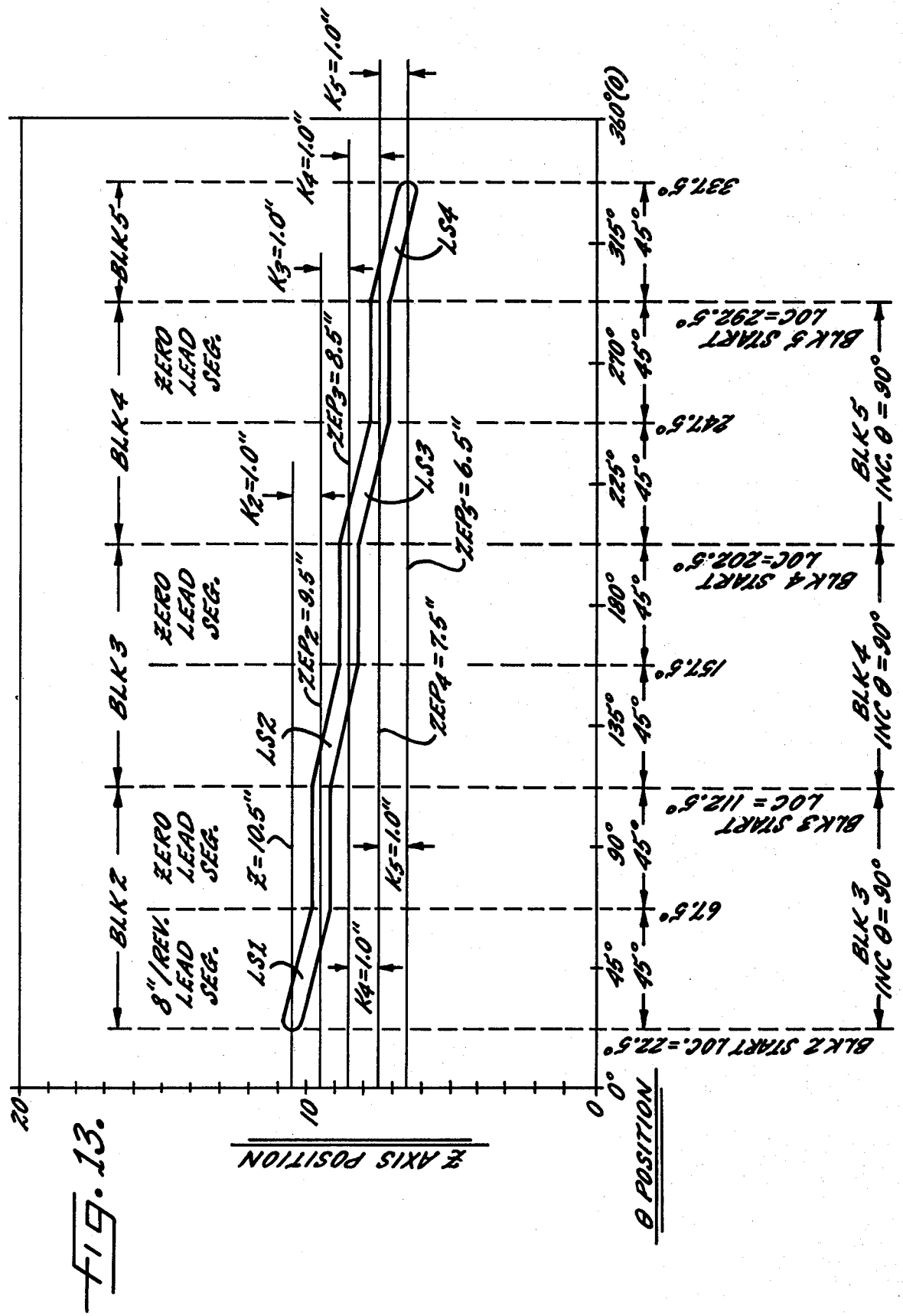

METHODS AND APPARATUS FOR LEAD SEGMENT MACHINING

CROSS REFERENCES TO RELATED PATENTS

Although no assertion is made that the present application is entitled to benefit of a filing date earlier than its actual filing date, cross reference is here made to U.S. Pat. No. 3,656,124 (hereinafter called Case A) issued Apr. 11, 1972 in the name of John K. McGee; and cross reference is made to U.S. Pat. No. 3,727,191 (hereinafter called Case B) issued Apr. 10, 1973 in the name of John K. McGee, Cross reference is also made to U.S. Pat. No. 4,041,287 (hereinafter called Case C) issued Aug. 9, 1977 in the names of Kolell and Conners and to U.S. Pat. No. 3,798,427 (hereinafter called Case D) issued Mar. 19, 1974 in the name of John P. Conners. These cross references are made to set forth the background of the present invention and to provide, without needless repetition here, detailed descriptive material which is either helpful to an understanding of the improvements claimed or which creats enabling support for some of the elements of the claims presented in this application.

SUMMARY AND OBJECTS OF THE INVENTION

The present invention relates in general to numerical control systems and in particular to the control of turning machines. More specifically, the invention relates to methods and apparatus for the machining of lead segments which are of predetermined and preselectable angular starting locations, lead ratio and angular extent—the machining being accomplished by execution of special lead segment data blocks included in a part program and which cause a numerical control system associated with a turning machine to operate in a unique mode or sequence which differs from the known modes for traverse, positioning, linear interpolation, circular iterpolation, or threading.

It is the general aim of the present invention to provide improvements in the organization and operation of numerical control systems associated with turning machines, the improvements bringing complete flexibility to the creation of lead segments on a cylindrical or arcuate workpiece.

An ancillary objective is to provide numerical control apparatus and methods for controlling a turning machine so that lead segments of preselectable angular starting locations may be formed by a cutter acting on a workpiece driven about a rotational axis.

A more specific object of the invention is to make it possible to machine a plurality of lead segments, each with its own preselectable angular starting location, within a total angular span of less than 360 degrees, and so that an "interrupted thread" type of groove may be easily formed on a workpiece.

Another object of the invention is to make it possible to machine lead segments on a workpiece interspersed between segments of zero lead, the resulting grooves being advantageously usable on cable drums or the like for the purposes and advantages described in Le Bus U.S. Pat. No. 2,620,996.

Still another object is to provide methods and apparatus which make it conveniently possible to machine successive short lead segments on a workpiece in a turning machine with the successively different angular starting locations, leads, signs of leads and extents of segments being fully predetermined by a part program—so that a variety of useful and desirable configurations may be formed on the surface of a cylindrical workpiece. Merely as specific examples, the invention makes it possible conveniently to machine oil grooves in cylindrical bearings, or specially configured slots in cylindrical cams.

BRIEF DESCRIPTION OF THE DRAWINGS

These and other objects and advantages of the invention will become apparent as the following description proceeds in conjunction with the accompanying drawings, in which:

FIGS. 6 and 7 are flow charts designating portions of the master or executive program held in the memory of FIGS. 2 and 3 to carry out operations in accordance with the present invention, such portions being simplified versions of a final servo control system which is more fully described in Case C;

FIG. 13 is a developed layout of the surface of a cylindrical workpiece having connected lead segments and zero lead segments formed, by executing a typical part program, according to the methods and apparatus of the invention.

While the invention has been shown and will be described in some detail with reference to exemplary embodiments, there is no intention that it thus be limited to such detail. On the contrary, it is intended here to cover all modifications, alternatives and equivalents which fall within the spirit and scope of the invention as defined by the appended claims.

DESCRIPTION OF A PREFERRED EMBODIMENT

As noted above, the present invention brings to the art an improvement in numerical control systems and methods which are carried out thereby. Numerical control systems are per se well known to those skilled in the art. To make the invention more quickly understood, it will be helpful to set out briefly by way of review the basic organization and operation of a typical numerical contouring system associated with a turning machine before proceeding to the detailed explanation of the novel improvements and their advantageous operations.

A. An Exemplary Machine Tool

Figure 1:
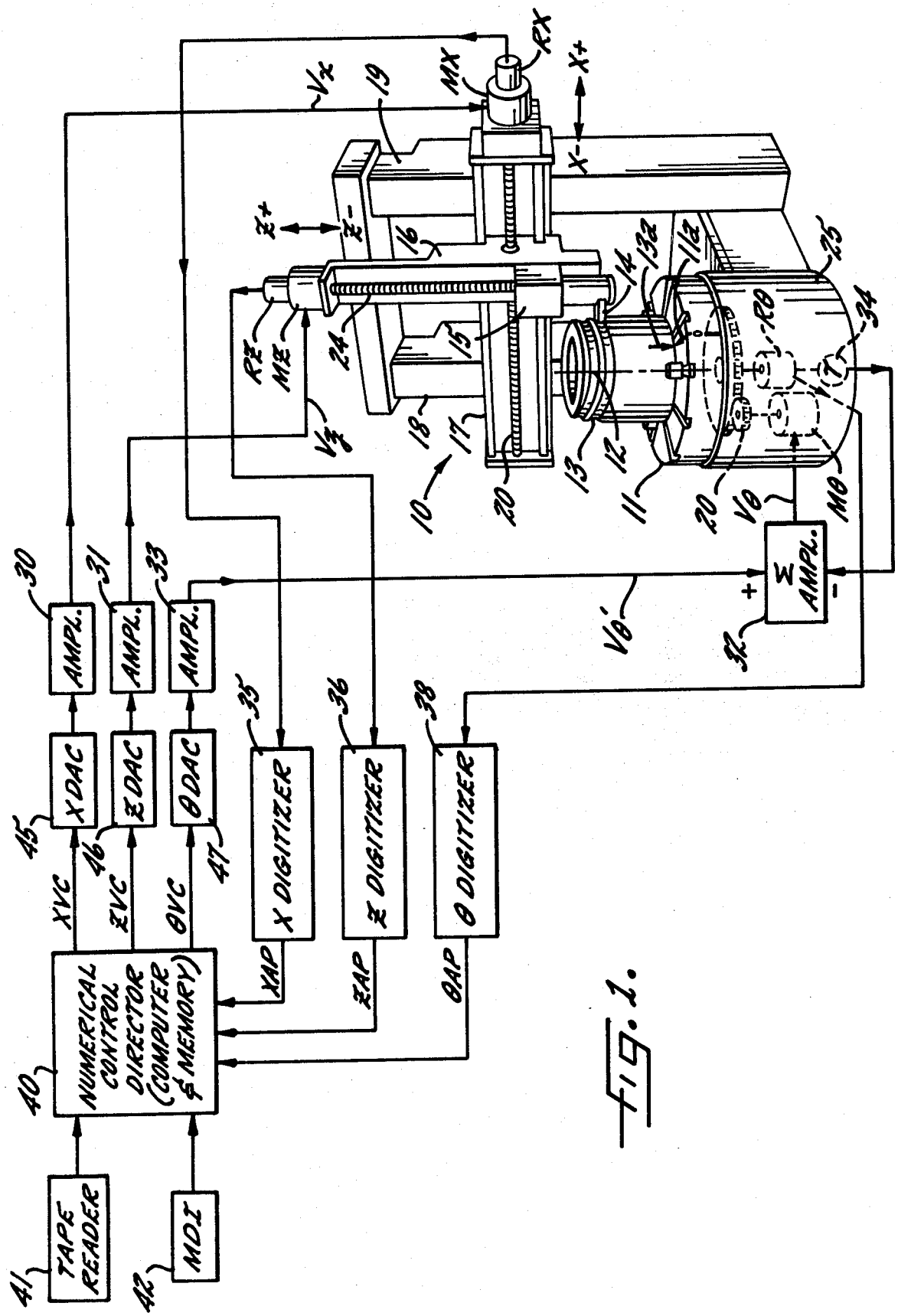
FIG. 1 is a generalized diagrammatic representation of a numerical control system associated with an exemplary controlled turning machine.

In order to illustrate one environment in which the present invention will find especially advantageous use, it will be described here with reference to controlling paths executed by a controlled member or cutting tool relative to a rotationally driven workpiece in a turning machine. The vertical turret lathe 10 shown in FIG. 1 is typical of the many different types of turning machines which may be controlled in response to successive blocks of part program data. The exemplary vertical turret lathe includes a work table 11 rotatable about a vertical axis 12 and adapted to carry a coaxially mounted workpiece 13 having a surface of revolution (cylindrical or arcuate when viewed as a section at right angles to the axis). Such workpieces will here be generically called "cylindrical" for brevity, and even though they may taper axially to have the shape of a cone or a bullet nose. A cutting tool or cutter 14 is mounted on, and vertically movable with, a ram 15 slidable in vertical ways (not shown) formed on a saddle 16, the latter in turn being movable horizontally along the ways of a rail 17 which is supported at its opposite ends by spaced vertical columns 18 and 19. The cutter 14 may thus be moved along a vertical Z axis, and along the horizontal X axis, relative to the workpiece 13 while the latter is being rotationally driven about the axis 12 of rotation. It should be understood, of course, that it is only the relative movement of the cutter 14 and the workpiece 13 which is important; the turning action to shape the workpiece 13 may equally be well carried out by keeping the latter stationary and rotating the cutter 14 about the axis 12; and similarly, the cutter 14 may be held stationary while the workpiece 13 is moved bodily along the X or Z axes. For convenience, the rotational position and movement of the workpiece 13 relative to the cutter 14 will be called the "$\theta$ axis" inasmuch as the angular position and speed of the workpiece are signaled or controlled as hereinafter described. It is a common practice in the machine tool industry to designate a rotational axis as the "B axis", but the symbol $\theta$ is here used to avoid confusion with the letter B which is employed as a general designation for "buffer" in the ensuing description. The symbol $\theta$ is thus used in this application as designating (in degrees or other units) the angular position of an imaginary reference mark 13a on the workpiece relative to the bearing of a radius extending from the axis 12 to the cutting edge of the cutter 14. If the reference mark 13a is aligned with a reference mark 11a on the table 11 (as shown), then an expression for the angular position of the table represents also the angular position of the workpiece.

By proper proportioning of the X and Z axis components of commanded movement and velocity, the cutter 14 may be made to move relative to the workpiece along a path and at depths to cut a desired contour. To produce such desired relative movement between the workpiece 13 and the cutter 14 along the horizontal X axis, the saddle 16 includes a nut (not shown) engaged with a lead screw 20 supported on the rail 17 and driven through suitable gears (not shown) by a reversible servomotor MX. As the latter motor is caused to rotate in one direction or the other at different speeds, the saddle 16 will be moved horizontally in a $+X$ or $-X$ direction and at velocities determined by the speed of the motor. Correspondingly, the ram 15 carries a nut (not shown) engaged with a lead screw 24 vertically disposed in the saddle 16 and driven by a reversible servometer MZ so that energization of that motor in one direction or the other moves the cutter 14 in $+Z$ or $-Z$ directions. Finally, the table 11 is rotationally supported on a stationary base 25 and equipped with a ring gear driven through a pinion 26 from a variable speed, reversible motor M$\theta$, whereby the table may be driven in one direction or the other (clockwise or counterclockwise) and at desired speed.

The motors MX, MZ and M$\theta$ form the final power elements of X, Z and $\theta$ servo systems. They are energized with respective voltages $V_x$, $V_z$, $V_\theta$ produced by respective power amplifiers 30, 31, 32. The latter amplifier is an algebraic summing amplifier receiving its primary input signal $V\theta'$ from an amplifier 33 and a velocity feedback signal from a tachometer 34 driven from and in timed relation to the table 11. Generally speaking, the three motors MX, MZ, M$\theta$ operate with speeds and directions which are proportional to the magnitudes and polarities to the energizing dc. voltages $V_x$, $V_z$ and $V_\theta$ applied thereto. As will become apparent, the speed of the table 11 is controlled by velocity servo action, while the motions along the X and Z axes are controlled by position servo action but with accurate velocities.

To signal the actual positions of the cutter 14 along the X and Y axes, any one of many suitable position feedback devices may be adopted. Shown here by way of example are resolvers RX and RZ mechanically coupled to the lead screws 20 and 24, but the well known rotary or linear Inductosyn type feedback devices may be employed. The resolvers RX and RZ supply their signals to conventional analog-to-digital converters here illustrated as an X digitizer 35 and a Z digitizer 36. For all intents and purposes, these digitizers continuously signal on multiconductor output lines, and in digital binary or BCD notation, numerical values XAP and ZAP which represent the instantaneous "X axis actual position" and "Z axis actual position". The use made of these signals will become apparent below.

In like manner, the angular position of the table 11 and its workpiece 13 is continuously signaled in digital form by any suitable means. Although either (a) a rotary Inductosyn device or (b) a pulse generator driven in timed relation to the rotation of the table and feeding a reversible counter may be employed for this purpose, the exemplary arrangement here shown includes a resolver R$\theta$ coupled to the depending spindle of the table 11. The output signal from the resolver R$\theta$ thus goes through one full cycle for each revolution of the table 11 and that signal is supplied to an analog-to-digital converter here shown as a $\theta$ axis digitizer 38. For purposes of discussion, and without limiting effect, the digitizer 38 is such that its output signal $\theta$AP cycles through a numerical representation of 0 to 3,999 as the table 11 rotates from a zero reference position through 359.91 degrees. The digitally signaled output signal $\theta$AP thus converts the span of one revolution or 360 degrees into 4000 parts or divisions, where each division corresponds to 360/4000 degrees. The scale units of the actual position signal $\theta$AP will hereinafter be referred to as "divisions". In the present example when the table 11 and workpiece 13 are at actual angular positions of 0°, 90°, 180° or 270°, the signals $\theta$AP will have values of 0, 1000, 2000 or 3000. It will be understood, of course, that other digitizing arrangements with different divisions or scales may be employed to continuously and digitally represent the actual angular position of the table and workpiece by the signals $\theta$AP.

B. An Exemplary Numerical Control System

For completeness, the specification and drawings in Cases, A, B, C and D are hereby incorporated by reference and made an integral part of the present disclosure. This will avoid the need for lengthy detail, and the brief review which follows is framed with the assumption that the reader is familiar with Cases A, B, C, D.

Referring again to FIG. 1, a numerical control director 40 receives successive blocks of input data which make up a "part program" defining a desired path through which the cutter 14 is to travel relative to the workpiece 13 in order to form or shape the latter. Each block of part program data defines one segment of that path, and the segments (which in a conventional system may be linear moves or circular arcs) are executed seriatum as the system responds to successive blocks. Although the blocks of input signals may be supplied successively from a punched tape reader 41 is well known fashion by intermittently starting and stopping the tape reader 41 (this being described in Case A and Case B), it is more convenient and preferred to read all of the blocks of an entire part program from a punched tape via the reader 41 into the part program portion of a memory contained within the director 40. Alternatively, a manual data input unit 42 including a keyboard (not shown) may be employed to enter blocks of part program data into the program portion of the memory within the director 40. As is known and practiced presently in the art, the numerical control director may then bring from its part program portion of memory each successive block of part program command data as that block of information is required. When a given part program block of data is taken from the part program storage section of the computer memory, it is first placed in a buffer memory section. The part program data may be pre-processed to effect certain conversions and then transferred from the buffer memory section to what is known as the "active block" section of the memory. The signals of the active block held in the active portion of memory are utilized in the interpolation procedure to generate the final velocity command signals XVC, ZVC and $\theta$VC which digitally and numerically represent the commanded velocities at which motions are to then be occurring along the X, Z and $\theta$ axes. These latter signals XVC, ZVC and $\theta$VC are applied to digital-to-analog converters 45, 46, 47 which in turn supply dc. input voltages, of corresponding sign and magnitude, to the inputs of the final amplifiers 30, 31, 33.

The director 40 shown in FIG. 1 differs from that described in Case A and Case B by including the improvements embodying the present invention, and to be hereinafter discussed in detail. As a preliminary matter, however, it may be noted that the final director output signals XVC and ZVC correspond in nature and purpose to the signals XVC and YVC designated in Case C. Whereas Cases A, B and C treat motions along two orthogonal axes designated X and Y, the present description designates that Y axis as a Z axis merely to conform the industry nomenclature, It should be understood that in referring to Cases, A, B, C, D all references therein to the Y axis should be viewed as pertaining to a Z axis for purposes of the present application.

It should also be observed as a preliminary matter that the separate digitizers 35, 36 and 38 here shown in FIG. 1 need not be actually employed; on the contrary, it is a preferred arrangement to feed the signals from the resolvers RX, RZ and R$\theta$ via sampling ADC's to the director 40 and to perform the analog-to-digital conversion by successive computational sequences within the director. Such conversion of resolver or Inductosyn signals to digital format within a computer is per se well known in the art. The separate digitizers 35, 36, 38 have here been shown merely as a convenience to aid in understanding the system as a whole.

Figure 2:
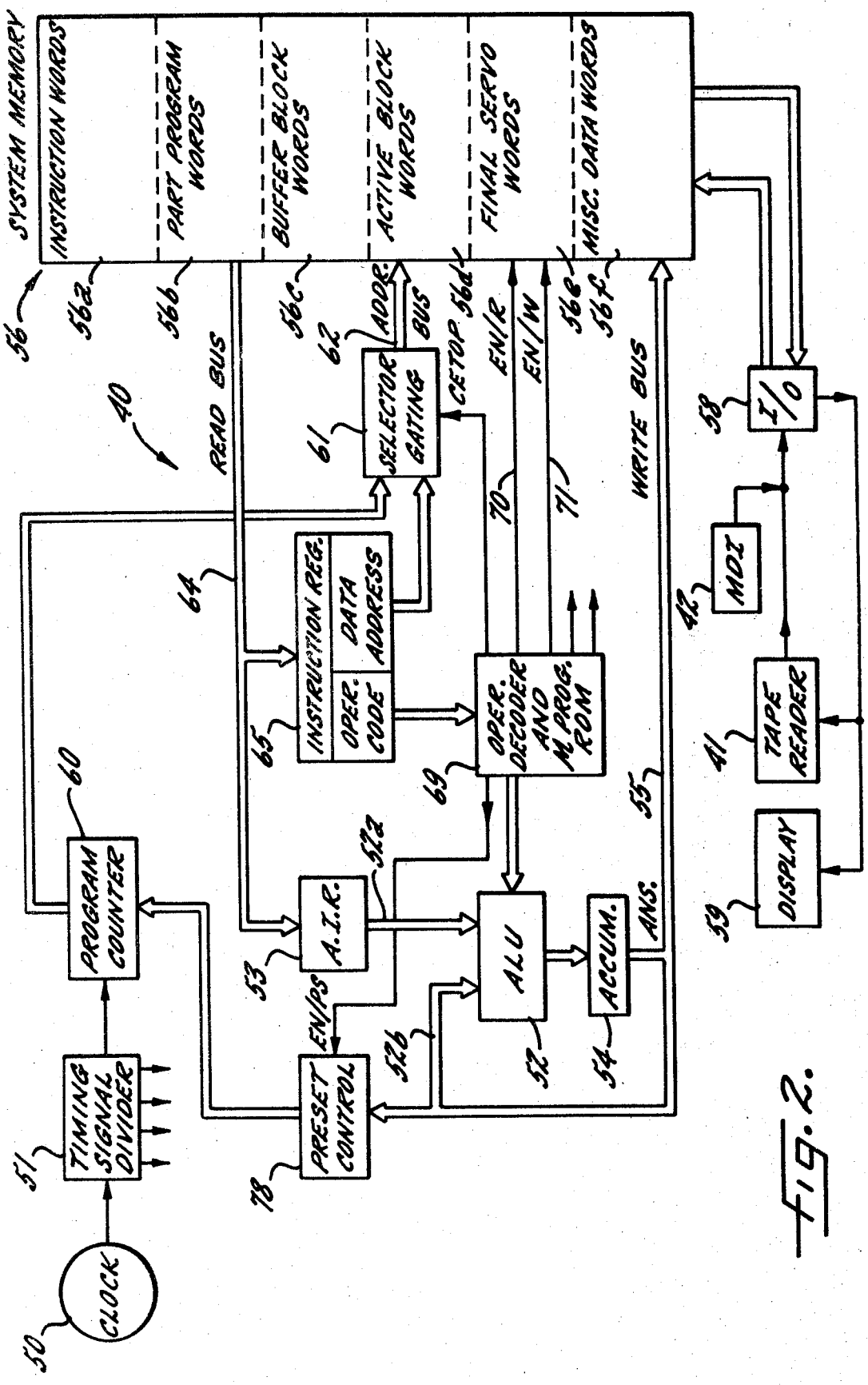
FIG. 2 is a diagrammatic block and line illustration of one suitable form of numerical control director embodying the features of and carrying out the methods of the present invention, such director appearing more generally in FIG. 1.
Figure 3:
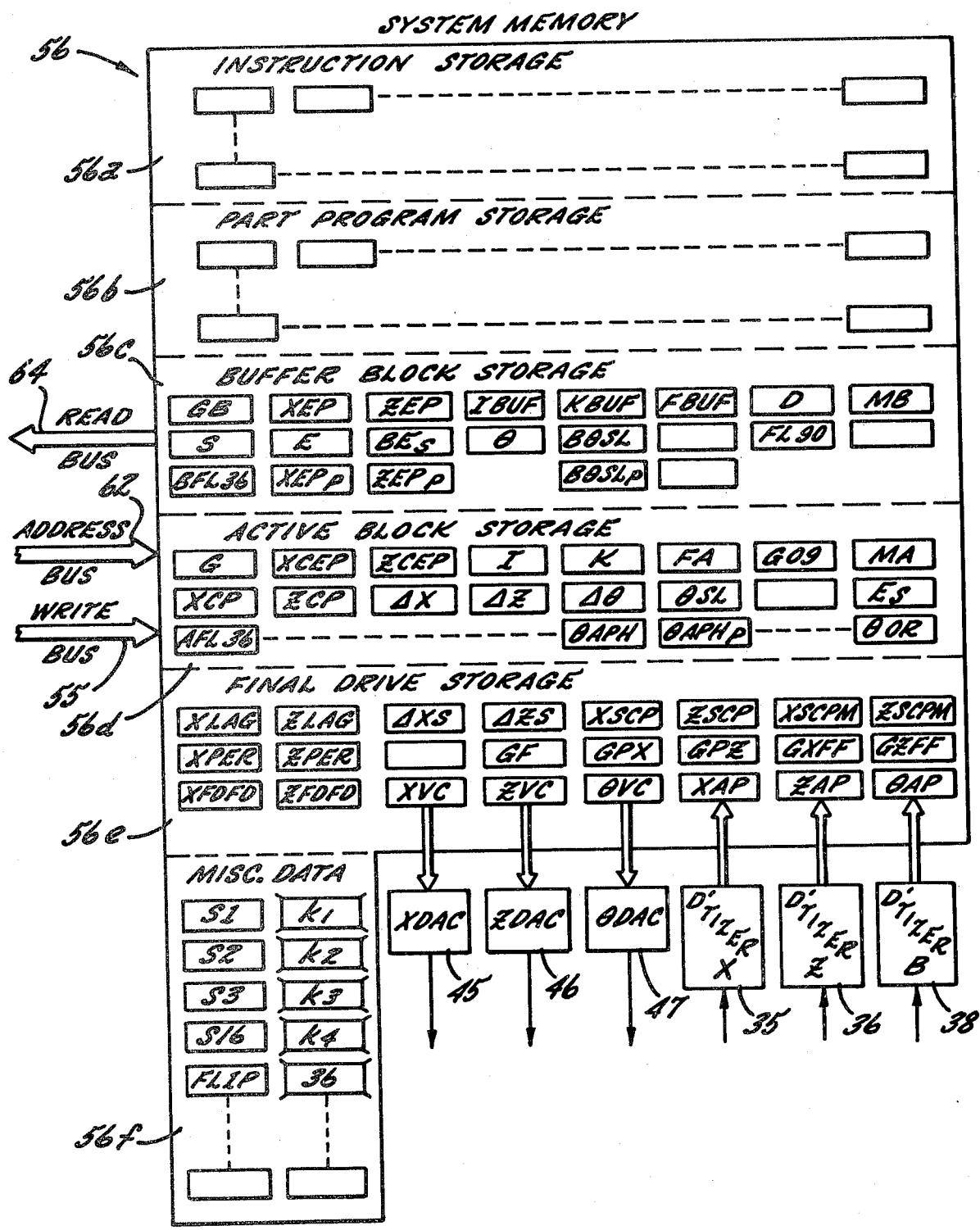
FIG. 3 is a block representation of certain signal storing registers or addressable word locations in the memory for the director of FIG. 2.

With the foregoing in mind, the organization of the numerical control director may now be considered with reference to a specific example illustrated in FIGS. 2 and 3. Although the director 40 may be constructed as an analog computer using dc. voltages to indicate signal values (and sample-and-hold circuits for memory), or as a computer programmed by hard-wiring connections (as specifically described in Cases A and B), the example of FIGS. 2 and 3 illustrates the director 30 as including a digital minicomputer loaded with a master instruction program. The internal details of such computers per se are well known to those skilled in the art, and any of a wide variety of computers currently available in the United States market may be chosen with an appropriate memory associated therewith.

In broad terms, the computer which forms the director 40 (FIG. 1) includes a clock oscillator 50 (FIG. 2) supplying pulses at a relatively high and constant frequency to a timing signal divider 51 which in turn sends appropriate timing signals to the other computer components (including a program counter 60) so that the elementary steps of fetching signals from memory, performing arithmetic operations, and storing the results at the proper memory address locations are carried out in rapid sequence according to a stored master program of instructions. For this purpose, the director or computer 40 includes an arithmetic-logic unit (ALU) 52 served by an input trunk 52$a$ leading from an arithmetic input register (AIR) 53. An accumulator 54 receives the output or "answer" signals from the ALU and transmits them over an output trunk 55 which, under certain circumstances, feeds back an operand to a second input bus 52$b$ for the ALU 52. The result of any arithmetic (e.g., add, subtract, multiply, divide), logic or comparison operation with the two operands signaled at 52*a* and 52*b* then appears in the accumulator (replacing its previous contents) and is here designated as ANS (an abbreviation for "answer").

The buses or trunks as shown in FIG. 2 are multi-conductor cables which carry multi-bit signals representing in binary or BCD format numerical values of variables which change as a result of inputs from the system memory 56 or computations performed by the ALU 52.

To facilitate description, system memory 56 includes what may be viewed as several different portions or sections comprising addressable registers or word locations to store different types of digital word signals. Specifically and as shown in FIG. 2, a first memory section 56*a* holds instruction words which make up the master or executive program of the system. A second memory portion 56*b* stores a plurality of blocks of part program data which make up an overall part program. A buffer memory section 56*c* holds the signals created by transferring one block of part program data from the memory section 56*b*, whereas an active block memory portion 56*d* contains the data words and signals which constitute or are derived from the preceding block of part program data. To create the final output signals which are fed to the digital-to-analog converters shown in FIG. 1, another memory section 56*e* contains words corresponding to those which have been described heretofore in Case C. The last memory section 56*f* contains addressable locations for miscellaneous words or flags which can be read or written in the course of operation.

The tape reader 41 and the manual data input panel 42 are coupled to the computer within the director 40 via an input/output interface 58 which sends signals to and receives signals from the system memory 56. More specifically, as the blocks of an entire part program are being read from punched tape by the tape reader 41, the resulting data signals are treated as readable words of memory, taken into the computer and re-stored in the part program memory section 56*b*. And, for the purpose of displaying to an operator the values of different variables held in the system memory 56, certain words are treatable as write-only memory locations whose contents may be transferred through the input/output interface 58 to a visual numerical display unit 59.

Because the organization and operation of the computer shown in FIG. 2 is well known, it will suffice to observe briefly that advancement of a program counter 60 to an address number will cause selector gating 61 to apply the program counter contents as address signals to an address bus 62, thereby conditioning the memory 56 to read out an instruction word stored at that address. The signals appear on a read bus 64 and are routed into an instruction register 64. An instruction word is made up of two portions, namely, an operation code and a data address. Thus, an instruction word contained in the register 65 results in appropriate signals being fed to an operation decoder and a microprogram ROM 69, the latter then supplying appropriate operation-controlling signals to various parts of the computer. The data address portion of an instruction word in the register 65 is fed via the selector gating 61 to the address bus 62 in order to designate the address word location into which signals are to be written or from which signals are to be read. The decoder 69 correctly supplies a signal to either a line 70 or a line 71 to enable the reading or the writing of data from or into the system memory at the address location then signaled on the bus 62. When data is to be written into the memory, it appears on the bus 55 which forms the output of the accumulator 54.

The operation decoder 69 supplies operation-designating signals to the ALU so that the latter either adds, subtracts, complements, compares and performs various other functions which are known in the art. It will here be assumed for ease of discussion that the ALU receives an add instruction unless otherwise noted.

Once an instruction has been brought from the instruction section 56*a* of memory to the register 65, the address in that instruction causes readout onto the bus 64 of the numerical data or operand contained in that address location. The operand signals are passed to the input of the arithmetic input register (AIR) 53 which in turn transfers those signals to the input 52*a* of the ALU. In other words, an instruction word brought into the register 65 normally causes "fetching" of an operand from the desired address within the system memory and the feeding of that operand via the AIR 53 to one input of the ALU. The input so applied at 52*a* to the ALU is treated as a first operand acting upon a second operand ANS signaled on the second input 52*b* of the ALU to carry out addition, subtraction or various other operations. At the conclusion of an arithmetic or logic sequence, the result or answer appears in the accumulator 54 as the new answer ANS and is routed via the trunk 55 for writing into an appropriate location or register of the system memory 56. The address at which those signals are written is determined by a further instruction word brought to the instruction register 65 along with a "write accumulator output to memory" operation code.

In certain circumstances it may be desirable to produce interrupts or jumps which require the instruction words in the memory portion 56*a* to be executed other than in straight sequential order. For this purpose, a preset control 78 may be conditioned by the operation decoder 69 to pass the numerical signals appearing on the accumulator output bus 55 to the program counter 60 in order to preset the latter to some specified address number. Absent such presetting, the program counter incrementally counts as a result of sequential pulses received from the timing signal divider 51. Thus normally the words of the master instruction program will be taken in sequence from their address locations as the program counter 60 is incremented, but the program counter may be preset to designated counts states via the preset control 78 in order to effect interrupts or jumps. All of the foregoing is well known to those skilled in the art of digital computers. It is here set out as an introductory background to the present invention next to be described.

FIG. 3 is an expanded diagrammatic illustration of the computer system memory 56, with the pertinent storage registers or address locations having acronym labels to make clear how certain signals are created and utilized. Each storage register or addressable memory location thus constitutes a means for producing a given set of signals which can be changed in value by programmed computations or transfers effected by the ALU 52 under control of the stored master program of instructions. The program instruction section 56*a* contains a very large number of instruction words which are formulated to cause orderly sequencing through the master program with branching and interrupts.

At this point it will be helpful to set down a list of acronyms for the various storage word locations and the changeable signals held therein, such listing being then available for convenient reference in the description which follows:

Buffer Memory Section 56c

GB: Preparatory Code (e.g., G00, G01, G02, G03, G36) for the type of motion to be executed. MODAL.

XEP: The X axis ending position coordinate for the buffer block segment.

ZEP: The Z axis ending position coordinate for the buffer block segment (called YEP in Cases A-D).

$XEP_p$: Same as XEP, but for the block preceding.

$ZEP_p$: Same as ZEP but for the block preceding.

IBUF: The X axis component or displacement for the buffer block.

KBUF: The Z axis component or displacement for the buffer block. (Corresponds to JBUF in Cases A-D).

FBUF: The path feed rate for the buffer block (not used for G36).

D: The path segment length = $\sqrt{I^2+K^2}$ (not used for G36).

MB: Auxiliary function codes. MODAL

S: Table speed (in r.p.m.). MODAL

E: The programmed lead ratio in inches per revolution. MODAL.

$BE_s$: The scaled programmed lead ratio in inches per division. MODAL $\theta$: The desired angular starting location (in degrees) for a lead segment block in buffer.

B$\theta$SL: Same as $\theta$ but scaled to units of "divisions".

B$\theta$SL: Same as B$\theta$SL, but for the "preceding" block.

FL90: A flag set or cleared by a G90 or G91 code received in a data block to designate the program information as being absolute or incremental.

BFL36: A buffer flat set when G36 code is received in GB.

Active Memory Section 56d

G: Same as GB, but for active block.

XCEP: Same as XEP, but for active block.

ZCEP: Same as ZEP, but for active block (called YCEP in Cases A-D).

I: Same as IBUF, but for active block.

K: Same as KBUF, but for active block (called J in Cases A-D).

FA: Same as FBUF, but for active block.

XCP: The iteratively changeable X axis commanded position.

ZCP: The iteratively changeable Z axis commanded position (called YCP in Cases A-D).

$\Delta X$: The increment to be moved along X axis per $\Delta T$.

$\Delta Z$: The increment to be moved along the Z axis per $\Delta T$ (called $\Delta Y$ in Cases A-D).

$\Delta \theta$: The angular increment actually moved by the workpiece in the preceding time span of $\Delta T$.

$\theta$SL: Same as B$\theta$SL, but for active block.

$\theta$APH: The actual present position of the workpiece (in divisions) held from sampling $\theta$AP at intervals of $\Delta T$.

$\theta APH_p$: Same as $\theta$APH except it represents the angular position during the preceding $\Delta T$ period.

$E_s$: Same as $BE_s$, but for the active block.

AFL36: Same as BFL36 flag, except for active block.

Final Drive Section 56e $\theta$VC: The desired table speed numerically scaled to make $V_\theta$ such that table is driven at r.p.m. substantially equal to S.

XAP: Same as XAP in Case C.

ZAP: Same as YAP in Case C.

$\theta$AP: The angular actual position (in divisions) of the table or workpiece.

All other memory words and symbols are the same as those designated in Case C, with "Z" being substituted for "Y".

Miscellaneous Data Section 56f

S1 through S16: Single bit flags which are equivalent to signals S1 through S16 produced by EOB counter in Case B.

$k_1$ through $k_4$: Predetermined stored numerical constants.

36: The stored constant 36.

FLIP: A single bit flag set to indicate completion of "first pass" iteration in execution of a G36 lead segment block.

The diagonal lines at the corners of certain rectangles shown in FIG. 3 are intended to indicate that the word stored and signaled in that register is a predetermined numerical constant. Of course, any stored constant is readily adjustable by reading into that word location a different value via the manual data input keyboard.

In the foregoing list of acronyms and FIG. 3, the buffer words XEP, ZEP, IBUF, KBUF, FBUF, D are the same symbols and variable numbers which are described in Cases A and B, remembering that the symbol "Y" in Cases A and B is replaced by the symbol "Z" for the present application. The same is true with reference to the active block storage words XCEP, ZCEP, I, K, FA, XCP, ZCP, $\Delta X$, $\Delta Z$. And, the symbols and the memory word locations shown in the final drive storage section 56e of FIG. 3 are the same as those employed in Case C. The symbols and signals in the buffer storage section not used previuously in Cases A-D are S, E, $BE_s$, $\theta$, B$\theta$SL, FL90, $XEP_p$, $ZEP_p$, $B\theta SL_p$ and BFL36. In the active memory section 56d, the numerical signals and word locations $\Delta \theta$, $\theta$SL, $E_s$, $\theta$APH, $\theta APH_p$ and AFL 36 are new and unique to the present application. And, as noted previously, the variable numerical signals $\theta$VC and $\theta$AP in the final drive storage section 56e are unique to the present invention.

To avoid a mass of detail and yet fully explain the invention to those skilled in the art, the program instruction words are not labeled in section 56a of FIG. 3 but are set out in the flow charts of FIGS. 4 through 7 and the Tables AA and BB which form a part of this specification. Those flow charts and tables will be described below. The memory section 56b (FIG. 3) contains registers which hold the successive blocks of data which make up an entire part program. This memory section may be viewed as the equivalent of a punched tape reader which is described in Case A and Case B. That is, once a plurality of successive blocks making up an entire part program have been stored in the memory section 56b, each of the successive blocks may be brought from storage in memory section 56b to storage in the buffer block section 56c. Only those addressable word locations pertinent to an understanding of the present invention are labeled in the buffer block storage section 56c in FIG. 3.

As explained in Cases A and B, when a given block $B_{n+1}$ of part program data is contained in the buffer storage section 56c, the data corresponding to the preceding part program block $B_n$ is contained in the active block storage section 56d. When the path segment corresponding to the active part program block has been fully executed, then the block of data contained in buffer storage section is transferred to the active storage section 56d and execution of that succeeding block of data is immediately commenced. While that latter execution is occurring, the succeeding block $B_{n+2}$ of the part program data is transferred from the part program storage section 56b (or from the tape reader) into the buffer block section 56c.

The data which are contained in the active block storage 56d are continuously processed by what is called "interpolation" in order to effect operation according to a traverse, linear interpolation, circular counterclockwise interpolation or circular clockwise rotation. These are the well known, conventional modes of operation of the numerical control director. For prior systems associated with turning machines, it has also been known to provide a "threading mode of operation" for the purpose of cutting threads on a cylindrically shaped workpiece. According to industry standards, the preparatory codes for creating different classes of operation have been:

G00: Rapid traverse in a point-to-point positioning mode.
G01: Linear interpolation.
G02: Circular interpolation, clockwise.
G03: Circular interpolation, counterclockwise.
G33: Threading mode.

The present invention brings to numerical control systems for turning machines an entirely new and different class or mode of operation which may be called "locatable short lead segments". This will become clear as the present description proceeds.

During the execution of a part program block of data contained in the active block storage section 56d, progressively updated commanded position signals for the linear axes (and in some cases for a rotational axis) are fed to changeable words of memory in the final drive storage memory section 56e. That final drive storage and the progressive changing of signals therein proceeds according to the method and the apparatus which is fully described in Case C. So much of that as is necessary to the understanding of the present invention will be treated in greater detail below.

With further reference to FIG. 3, the miscellaneous data memory section 56f may contain many addressable word locations, and only those pertinent to an understanding of the present invention are here shown. In particular, there are sixteen words or single bit flags designated as S1 through S16 in FIG. 3. These correspond to the signals produced by the EOB counter treated in Cases A and B, and they are used to effect transitions in the operation of the director as there described. Further, certain numerical constants are pre-stored (although they are changeable) in the miscellaneous data memory section 56f; these are shown in FIG. 3 as containing the numerical constants $k_1$, $k_2$, $k_3$ and $k_4$. Finally, the constant "36" is stored at one addressable memory location in section 56f and a single bit "first pass" flag FLIP is also located there.

Referring conjointly to FIGS. 1 and 3, certain signals created outside of the numerical control director 40 are treated as "readable only" words of memory which can be addressed and taken onto the read bus 62. As here shown, the digitizers 35, 36, 38 continuously produce their actual position signals XAP, ZAP and $\theta$AP which are figuratively fed to readable only words of memory in the final drive storage section 56e. Thus, whenever it is desired to read into the computer ALU 52 the actual position signal ZAP, it is only necessary that an "enable read" signal be applied to the memory system along with address signals corresponding to the address of the storage location ZAP. Further, and as shown in FIG. 1, the numerical control computer produces final output signals which are fed to the X, Z and $\theta$ digital-to-analog converters 45, 46, 47. This is shown in FIG. 3 where "writable only" words of memory XVC, ZVC and $\theta$VC feed multi-bit signals continuously to the inputs of those three converters.

It may be assumed, according to the example given in Case A and Case B, that the successive time periods $\Delta T$ measured off by the clock 50 (FIG. 2) and the timing signal divider 51 are each 20 m.s. in duration. Within each such period, sub-periods are marked off by timing pulses so that a sub-routine may be executed every tenth of a $\Delta T$, i.e., every 2 ms. Finally, computational timing pulses appear at a high rate—so that many fetch, compute or store steps may be executed during each 2 ms. interval. These particular time period choices are exemplary only; they can be chosen to have other specific values such as 32 m.s. for the macromove period $\Delta T$ and 4 m.s. for the micromove period $\Delta T/N$. As indicated in Case A, the periods $\Delta T$ are subdivided into sub-periods $\Delta T/N$ where n is any conveniently chosen integer.

From Cases A and B, it will be understood that the numerical control system may be conditioned to operate in the normal and known main fashions of linear, circular clockwise or circular counterclockwise interpolation after receipt of a preparatory code G01, G02 and G03. Case D describes the traverse mode effected by the preparatory code G00. In the circular interpolation mode, the variables $\Delta X$, $\Delta Z$, I and K are all incrementally changed during successive iterations of time periods $\Delta T$, whereas in both linear and circular interpolation modes the dynamically changeable numerical signals for XCP and ZCP are iteratively changed by amounts $\Delta X$ and $\Delta Z$ during each period $\Delta T$. In summary, therefore, it should be understood from the disclosures of Cases A–D herein incorporated by reference that the director of FIGS. 1, 2 and 3 operates for conventional motion classes (G00, G01, G02 or G03) to perform standard numerically controlled operations based on the successive blocks of an overall part program.

The pertinent characteristics of any director, to which the improvements of the present invention may be applied are:

A. Means are provided for measuring off successive, equal periods $\Delta T$ in actual time. See the central timing system of FIG. 9b and Columns 19–24 in Case A by way of example.

B. Means are provided to produce position increment signals $\Delta X$ and $\Delta Z$ during each period $\Delta T$. These signals in magnitude and sign depend not only on the path feed rate designated by block input signals but also on the angle of the path vector relative to X axis. They represent the distances to be moved along the X and Z axes during each period $\Delta T$, and thus they have dimensions of velocity, i.e., distance per unit time.

C. Means are provided to update or change the primary commanded position signals XCP and ZCP during each period $\Delta T$ by the amounts represented by the signals $\Delta X$ and $\Delta Z$.

See for example, Table III in Case A. The operation may be expressed:

$XCP_i = XCP_{i-1} + \Delta X$ (1)

$$ZCP_i = ZCP_{i-1} + \Delta Z$$

(2)

In those equations, the subscript "i" is used to indicate the iteration procedure, that is, the value of the variable XCP during "this period i" is formed and replaced with a new value which is equal to the value of the same variable XCP during the "previous period i−1" added to the incremental macromove $\Delta X$.

Of course, numerical directors of equivalent nature and specifically different organizations may be chosen to produce the primary, periodically changing position command signals XCP and ZCP. It is important only to understand that, in the embodiment of the present invention, such signals are normally available and periodically changed in order to carry out the conventional classes of motion, i.e., traverse positioning or linear or circular interpolation. In the specific director here shown by way of example in FIGS. 2 and 3, the commanded position signals XCP and ZCP are produced for linear and circular interpolation in the correspondingly labeled storage register locations, the updating being effected by fetching from storage those signals, fetching the incremental moves $\Delta X$ and $\Delta Z$ for addition thereto, and restoring the resulting sums as new values in the memory registers XCP and YCP.

C. Lead Segment Block Format and Data

In accordance with the present invention, a different type of system operation—as contrasted to traverse(G00), linear interpolation (G01), circular interpolation (G02 or G03) and a prior art threading mode (G33)—is established when any lead segment block of data is encountered during the execution of the successive blocks within an overall part program. Such lead segment blocks are characterized by a special preparatory code, here arbitrarily chosen as G36. Those types of part program blocks will here be called "G36 blocks" for brevity. Each such special lead segment block of program data includes numerical data words directly or indirectly representing:

(a) The desired angular starting location $\theta$ (in degrees) for a lead segment to be machined;

(b) The desired lead ratio E (in inches per revolution) for that lead segment; and (c) The desired ending location of that lead segment expressed as an absolute position (ZEP) along the Z axis.

For the first and/or the last of a succession of G36 blocks, there may also be included the desired ending position (XEP) along the X axis, and this will result (as explained below) in coordinated X and Z motions so that the cutter enters the groove or backs out of the groove "in lead".

Any such G36 "lead segment block" may be programmed with $\theta$, ZEP and XEP commands designated in absolute (axis position coordinates) or incremental (axis component displacement) values. The system is conditioned to accept lead segment program blocks in absolute or incremental format by a preparatory command (G90 or G91) which when brought from part program storage (either memory section 56b or a punched tape) is translated to set or clear a one bit flag shown in FIG. 3 as FL90.

Thus, the word format for any special G36 code lead segment block may be:

G36 E $\theta$ ZEP XEP G90/91

The value of "36" associated with a G36 code is of course always received or is modally in the buffer register GB when a lead segment block of data is received from part program storage. The values of E, $\theta$, ZEP, XEP are preselectable for each block, although the lead ratio number associated with the word E is received and treated modally within the numerical control director. That is, once a given value has been brought in to the memory register E with one G36 block, that value remains effective until a subsequent new value is brought in.

If it is assumed that the right side of the cylindrical surface of a workpiece 13 (FIG. 1) is located at an X axis position of 13.43 inches, and that the workpiece extends upwardly between Z axis coordinate positions of zero (at table level) and 20 inches, then an exemplary succession of lead segment part program blocks might be prepared with the following numbers:

EXAMPLE I

| BLK 1 G00 |         |          |          |         |
|-----------|---------|----------|----------|---------|
|           |         | ZEP 10.50| XEP 13.43| G90 S12 |
| BLK 2 G36 | E8 θ22.5| ZEP 9.50 | XEP 13.33| G09     |
| BLK 3     | θ112.5  | ZEP 8.50 |          | G09     |
| BLK 4     | θ202.5  | ZEP 7.50 |          | G09     |
| BLK 5     | θ292.5  | ZEP 6.50 | XEP 13.43| G09     |
| BLK 6 G00 |         |          | XEP 23.43|         |

In a fashion and for the reasons to be explained below, the execution of the foregoing part program block sequence, in accordance with the invention, will cause an "interrupted thread" groove to be cut in the workpiece at a depth of 0.10 inches. FIG. 13 shows a developed view of the workpiece surface in accordance with Example I, a continuous groove being formed with four lead LS1-4 segments separated by three intervening straight or "zero lead" segments. A zero lead segment is not deemed to be a lead segment for purposes of this application since zero lead is no lead at all. The four lead segments LS1-4 are each of 45 degrees in angular extent and span a distance of 1.0 inches along the workpiece axis (Z axis). Each of those separated lead segments has a helical lead of 8 inches per revolution due to the command "E8" (also expressible as a lead of 0.0222 inches per degree).

Each of the zero lead segments (FIG. 13), which lie between two lead segments is, by the part program of Example I, made 45 degrees in angular extent. This follows because the $\theta$ numbers shown in the table for Example I designate the angular starting locations for four machined lead segments, but as hereinafter explained the Z axis motion and a lead segment is terminated when the cutter reaches the programmed ending location ZEP for any special lead segment block.

FIG. 13 shows that the data of block BLK 2 in the foregoing Example I will result in a lead segment being started at an angular location of 22.5 degrees on the workpiece when the cutter is at a Z axis position of 10.5 inches; and the Z axis motion will be terminated when the cutter reaches a Z axis position of 9.50 inches. Since the lead is 8 inches per revolution, the table will rotate ⅛ of a revolution or 45 degrees while the cutter moves downwardly a distance of 1.0 inches. Thus, the lead segment corresponding to block BLK 2 of Example I will be 45 degrees angular extent and the ending location is 22.5°+45°=67.5°. Since the next lead segment (block BLK 3) will not begin until the cutter reaches an angular location of 112.5 degrees on the workpiece, the cutter will form a straight zero lead segment which is 45 degrees in angular extent before the succeeding lead segment is initiated.

The significance of the program data in Example I will become clear as the methods and apparatus of the invention are further explained below. For the present, however, it may be noted that block BLK 1 in Example I is merely to set up proper conditions for initiating the desired interrupted thread groove; it causes the cutter to be positioned in a traverse mode to the desired height (Z axis position of 10.50 inches) at which the composite groove is to be initiated on the workpiece surface, and it further causes the tip of the cutter to come barely in contact with the workpiece surface (at an X axis position of 13.43 inches). Further, the preliminary block BLK 1 contains the S12 command which will be accepted by the control system to cause the table 11 (FIG. 1) to be driven at the desired speed of 12 r.p.m. The last block BLK 6 in Example I is included merely to traverse the cutter (in a G00 mode) to the right so it is withdrawn about ten inches clear of the workpiece. The G00 code in block BLK 6 causes cancellation of the "G36 mode" as explained below. It should be noted that blocks BLK 2 and BLK 5 both contain X axis end position commands. These will result in the first and the fourth lead segments tapering from zero to 0.10 and from 0.10 to zero depth. And because the S (BLK 1), G36, and E words are modal, each of blocks BLK 2 through BLK 5 are executed with the table running at a speed of 12 r.p.m. and in the lead segment mode even though blocks BLK 3, 4, 5 do not actually include the G36 word.

A program fully equivalent to Example I but formed in incremental numbers is illustrated by the following part program data blocks:

EXAMPLE I'

| BLK 1 G00 | θ0.00 | ZEP 10.50 | XEP 13.43 | G90 S12 |
| BLK 2 G36 | E8 θ22.5 | K−1.0 | I−0.10 | G91 G09 |
| BLK 3 | θ90 | K−1.0 | | G09 |
| BLK 4 | θ90 | K−1.0 | | G09 |
| BLK 5 | θ90 | K−1.0 | I+0.10 | G09 |
| BLK 6 G00 | | | I+10.0 | |

In Example I' above, block BLK 1 is the same as in Example I. It merely serves to bring the cutter to the desired location at which the lead segment machining is to begin, and it conditions the system so that the table rotates at a desired speed of 12 r.p.m. (S12). Block BLK 2 in Example I', however, contains the preparatory code G91 which designates that following program data is in incremental form. Thus, in block BLK 3 of Example I' the starting location for the second lead segment is designated by the command "θ90" which means that the lead segment LS2 (FIG. 13) is to be started at an angular location displaced 90 degrees from the starting location of the first lead segment LS1. Block BLK 2 by its command "θ22.5" designates that the segment LS1 is to be initiated at an angular location of 22.5 degrees. Block BLK 2 also designates that the corresponding segment LS1 is to be 45 degrees in angular extent. Since as shown in FIG. 13, it is desired that segment LS1 be followed by a zero lead segment of 45 degrees (as explained above), the next lead segment is to begin at 112.5 degrees. Therefore, the segment LS2 should begin at a location displaced by 90 degrees from the start of segment LS1. This angular increment is the starting location "θ90" in BLK 3 of Example I'. Thus, the incremental θ words in Example I' are numerically representative of angular increments between starting locations of successive lead segments, as labeled at the bottom of FIG. 13.

In like fashion, the command data for the Z and X axes in Example I' represents, by values for K and I words, the axis displacements which are to be executed rather than the axis end point positions. Since block BLK 2 begins when the cutter has been brought to a Z axis position of 10.50" (per BLK 1), a K command of −1.0 will result in the cutter moving to a Z position of 9.50" during the execution of the block BLK 2 lead segment. The same rationale applies to the I commands for the X axis.

In Examples I and I', the code G09 appears in each of the lead segment blocks BLK 2 through BLK 5. The "G09" code causes the execution of actual movement for any block to end with "automatic deceleration to zero velocity" as fully described in Cases B and D. This prevents overrun beyond the Z or X end point, and it is employed whenever a lead segment is to be ended without Z axis motion immediately following the end of a lead segment (i.e., when two lead segments are not to follow in physical head-to-toe relation). Because the G09 "automatic deceleration to zero velocity" apparatus and methods are set out in the Case B and Case D specifications here incorporated by reference, no further details are required and the reader will understand that any G36 block with the G09 code signaled therein will bring the cutter smoothly to zero velocity as it reaches the Z (and X) end point of a segment. A memory word G09 is shown in FIG. 3 to indicate, for completeness, that when any block of part program data, which does or does not include a G09 code, is in the active memory section 56d, a one bit "G09 flag" is set to contain a "1" or a "0". The G09 bit signal here corresponds to the signal DTZ described in Cases B and D, and its setting or clearing will be assumed to occur when any block of data is transferred to active memory in any mode (including G36) of operation.

D. Direct Control of Table Speed S

As noted in Example I above, the desired table speed is represented by an S command number which is contained in any part program block which precedes one or more path segment blocks. The S command is "modal". That is, once an S number is received in the buffer address location S, it remains effective until a new and different S number is received from some subsequent block. When buffer block data is transferred to the active memory section 56d (FIG. 3), the S number is "scaled" and a table velocity number θVC is written into the corresponding memory word in section 56e, such that:

$$\theta VC = k_1 \cdot S \qquad (3)$$

The constant $k_1$ is chosen (and pre-stored in memory section 56f) in the light of the gain factors for converter 47, amplifier 33 and amplifier 32 such that the velocity servo causes the table to rotate with a constant angular velocity approximately equal in r.p.m. to the original number S. Precision is not required in table speed, but the feedback from tachometer 34 (FIG. 1) maintains table speed very close to that commanded as loading due to cutter action varies.

E. Execution of the Method For Lead Segment Machining

In carrying out the improvements of the present invention, and with the foregoing introduction in mind, the director 40 is conditioned by master instructions (contained in memory section 56a of FIG. 3) to constitute a plurality of means for performing certain functions and to carry out the method steps which are involved. The digital computer within the director 40 is not the only apparatus involved, however, since the means for producing actual position feedback signals XAP, ZAP and $\theta$AP are outside the computer, as are the digital-to-analog converters 45, 46, 47 together with the motors MX, MZ, and M$\theta$ energized with the outputs from such converters. A detailed understanding of a preferred embodiment of the invention may best be gained from a narrative sequence of the operations which repeatedly recur, with the pertinent sub-routines of the master program being explained with reference to the sub-routine flow charts of FIGS. 5 through 7 taken with more detailed program listings set out in Tables AA and BB (located for convenience at the end of this specification). The flow charts and listings will show fully how the computer of FIG. 2 and its memory of FIG. 3 are "set up" to embody the present invention.

Recognizing that one or a plurality of successive lead segment blocks (e.g., as in Example I or I') have been placed in the part program memory section 56b, each lead segment block, when brought into buffer storage section 56c results in signals representing, actually or implicitly and in absolute or incremental form, (i) the special designating code G36 which is modal, (ii) a desired lead ratio E which is modal, (iii) a desired angular starting location $\theta$, (iv) a desired axial or Z axis ending position.

Figure 4:
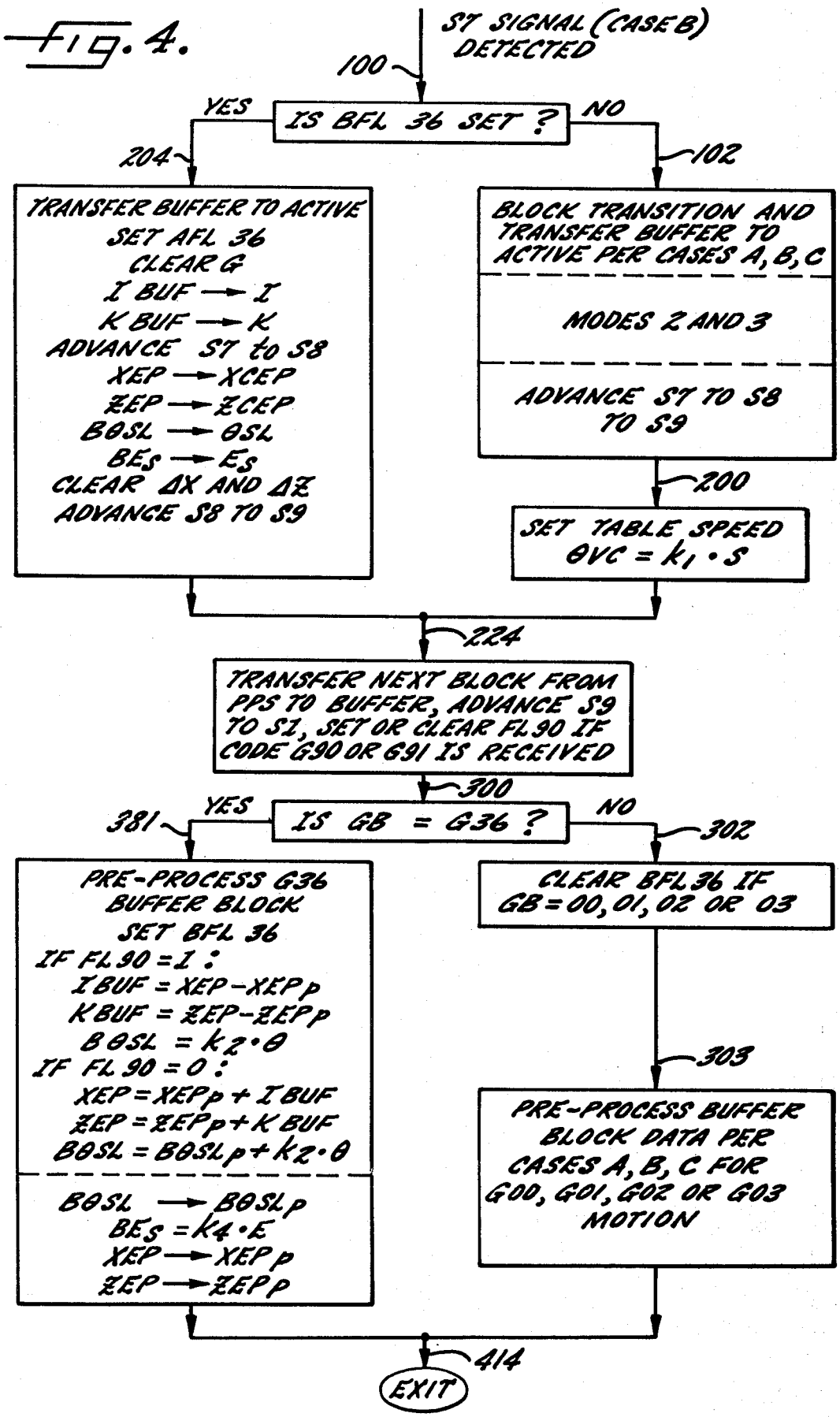
FIG. 4 is a flow chart designating a portion of the master instruction program contained in the memory of FIGS. 2 and 3 and which conditions the numerical control director to carry out the execution of lead segment machining in accordance with the invention.

FIG. 4 and Table AA set out the master instruction program (held in memory section 56a) which is executed when any part program block (in the active memory section 56d) is about to be fully completed. As explained in Cases A and B, a signal S7 appears (from the EOB counter in Case A but in the S7 flag word of FIG. 3 for the present disclosure) when transition from one active block to the next is required. Thus, the sub-routine of FIG. 4 and Table AA is entered in response to the appearance of an "S7" signal. The general operations then to be performed are (a) transferring of the signals in buffer memory to active memory, (b) transferring from part program memory (section 56b) to buffer the next succeeding block of the part program, and (c) preprocessing the new data in buffer memory so that it will be ready, when later required, for transfer to active memory. If the part program block presently in buffer section 56c has the special lead segment designator G36 associated therewith, a buffer flag BFL36 (one bit word of memory) will have been set (will contain a "1").

When the S7 signal is detected at program step 100, the flag BFL is tested. If it is not set, operation proceeds to step 102 et seq. where block transition and buffer-to-active transfer occurs for the "normal path classes" designated by G00, G01, G02, or G03—as fully described in Cases A–D. This entails advancing the transition signals from S7 to S8 and then to S9, ending at step 199 as generally indicated in Table AA. The scaling of the S command (to change the table speed signal S to $\theta$VC) occurs at steps 200–203 to compute and set $\theta$VC according to Equation (3), supra. The computer of FIG. 2 will then jump to step 224.

But if at steps 100, 101 the flag BFL36 is found to be set, then buffer-to-active transfer take place according to special "G36 mode" operations during steps 204 to 223. At steps 204, 204a a "1" is brought to the AIR 53 (FIG. 2), added to zero so it appears as ANS in accumulator 54, and written thence to memory location AFL36. This "sets" the flag AFL36, so that the system knows the block being transferred into the active section 56d is a special "lead segment". During the subsequent step 205 "zero" is written to the active G register, clearing out any normal path mode signals (G00, G01, etc.) which may have been therein. On steps 206 to 210 segment displacement numbers in IBUF and KBUF are transferred to the active registers I and K. On steps 210–212, the S7 signal is removed and advanced to S8. Then on steps 213–216, the buffer axis end point numbers XEP and ZEP are transferred to the corresponding active registers XCEP and ZCEP. An angular starting location number B$\theta$SL (pre-formed as noted below) is transferred to the counterpart active register $\theta$SL on steps 217–218, while a buffer lead ratio number in BE$_s$ is transferred to the active register E$_s$ on steps 218a and 218b. And, because new values of $\Delta$X and $\Delta$Z will be created when active processing of the transferred block begins, zero's are written into the active register $\Delta$X and $\Delta$Z to "clear" them on steps 219, 220. Thereafter at steps 221–223 the S8 signal is cleared and the S9 signal is set before proceeding to step 224.

Having arrived at step 224 by either of two routes shown in FIG. 4, the system then pulls the data of the next part program block from part program storage (either memory section 56b or the next block on a punch tape via a tape reader). Since this operation is described in Cases A–D, it is only generally set out at steps 224–229 in Table AA, and it results in the transition "S signal" advancing from S9 to S1. If G90 or G91 code signals are received during this transfer, they do not enter the GB register but serve to set or clear the "absolute" flag FL90 (FIG. 3).

If the new data block is a lead segment block, it results in the number "36" being placed (or left) in the GB memory word. If the path segment block is in absolute format, it results in fresh position command numbers being stored at XEP and ZEP (although in most cases the former number XEP will be absent). If the new path segment block is in incremental format, fresh axis displacement numbers are stored in IBUF and KBUF. Further, a desired lead ratio number will be placed (or left in) the buffer memory word E; and a new desired angular starting location number will be transferred into the buffer memory word $\theta$.

At steps 300–302, a test is made to see if the part program block just-received in the buffer section is one for the special lead segment mode or one for the normal path modes. The contents of register GB are bought to the accumulator, and the constant "36" then subtracted. If at step 302 ANS is zero, then the new block in buffer is a "G36" block and the system jumps to step 381. If ANS is not zero, the new buffer block is for a normal path mode, so on step 302a the flag BFL36 is cleared if ANS is −36, −35, −34 or −33 (indicating that the contents of GB are G00, G01, G02 or G03). Thereafter at steps 303–380, the new data in buffer section 56c are "pre-processed" in the normal fashion described in Cases A–D, ending at step 414 where the sub-routine is complete.

If on step 302, ANS is 0 to indicate the new buffer data is a "G36" block, then the jump to step 381 results in the flag BFL36 being set (or left set). Thereafter the new path segment block data are pre-processed according to whether they have been received in absolute or incremental format (i.e., whether flag FL90 is set or cleared). If on step 384 the FL90 is found to be a "1", then new values of axis departures are formed from the absolute data numbers XEP, ZEP. This involves auxiliary memory words $XEP_p$ and $ZEP_p$ which are conditioned to hold the values of ZEP and XEP for the "previous" block (i.e., the one now in the active section). It will be apparent from Table AA and FIG. 4 that the computations and storing at steps 385–390 proceeds to make:

$$IBUF = XEP - XEP_p \qquad (4)$$

$$KBUF = ZEP - ZEP_p \qquad (5)$$

Thus, if only end point position data is received in an absolute format G36 block, the departures I and K are formed.

Also, if FL90=1, then at steps 391–393, the starting angular position $\theta$ (in degrees) is scaled to produce a buffer number B$\theta$SL in "divisions". With the stated assumption that one revolution or 360° is treated as 4000 divisions, any number N in degrees may be converted to a number M in divisions:

$$M \text{ divisions} = N \text{ degrees} \times 4000/360 = 11.111N \qquad (6)$$

Thus, the constant $k_2$ (memory section 56f) is stored as 11.111 and at steps 391–393 the converted number B$\theta$SL becomes:

$$B\theta SL = k_2 \cdot \theta = 11.111\theta \qquad (7)$$

For example, if the commanded starting location is 90° the number B$\theta$SL becomes 1000 divisions.

On the other hand, if the system is in the incremental data format and the flag signal FL90 is a "0" on step 384, the steps 385–395 are skipped, and steps 396–405 are executed. In this case, the new data received in buffer section 56c includes numbers IBUF, KBUF and a starting location $\theta$ expressed as an increment angle from the starting location of the previous block to the starting location of the block now in buffer. Thus, new values of end points for the buffer block are formed by the manipulations during steps 396–401:

$$XEP = XEP_p + IBUF \qquad (8)$$

$$ZEP = ZEP_p + KBUF \qquad (9)$$

Thereafter, an absolute starting angle is formed from the $\theta$ number and stored in B$\theta$SL using the "saved" absolute starting angle B$\theta SL_p$ of the "previous" block. At steps 402–406 the sequences involves first converting the incremental angle command $\theta$ in degrees to "divisions" and then adding it to the "previous" starting angle:

$$B\theta SL = B\theta SL_p + k_2\theta \qquad (10)$$

The "present" value of B$\theta$SL is transferred (step 406) as a new value into B$\theta SL_p$ so that it can be used when the next G36 block of data is received in buffer memory. The signals B$\theta SL_p$ are always updated on step 406 in either the absolute or incremental data format, so that when a fresh series of incremental data G36 blocks is received, the starting location of the first lead segment is determined from the starting location of the last previously-executed lead segment.

At steps 407–409 (whether reached via step 405 or by jumping from step 395 to step 406), the commanded lead ratio E in inches per revolution is scaled to a number having dimensions of inches per division. A constant $k_4$ is pulled from memory and multiplied by the lead command E to write $BE_s$:

$$BE_s = k_4 \cdot E \qquad (11)$$

Since there are here assumed to be 4000 divisions per revolution, the constant $k_4$ is chosen to be $2.5 \times 10^{-4}$ since $$BE_s = E/4000 = 2.5 \times 10^{-4} \times E \qquad (12)$$

to express $BE_s$ in inches per division.

At step 410–413 the "this buffer block" end points are saved for processing of the next block by transferring the values in XEP and ZEP to the registers $XEP_p$ and $ZEP_p$. The routine of FIG. 4 and Table AA is then complete and is excited at step 414.

The transfer of one special "G36" block B from buffer to active (steps 204–223) is thus accomplished, the next block $B_{n+1}$ is brought to the buffer memory section (steps 224–299), and the part program data of the latter block is "pre-processed" (steps 381–414) —as shown in FIG. 4 and Table AA. If the block $B_{n+1}$ is in absolute format, the values of the axis displacements are formed in IBUF and KBUF; if that data is in incremental format, the data block values IBUF and KBUF are used to form XEP and ZEP and the incremental number $\theta$ is converted to an absolute angular starting location in B$\theta$SL. All of the numbers ($\theta$ and E) involving angles are scaled to form numbers B$\theta$SL and $BE_s$ having angular dimensions in divisions rather than degrees or revolutions.

The description of the buffer memory section 56c and the preprocessing of part program data therein prior to the transfer to active section 56c is here set forth to conform to the descriptions in Cases A, B, C. In actual practice, it may be preferred to omit the buffer section 56c and, when a block of data in active memory is fully executed, to transfer the next block directly from the part program memory section 56b to active section 56d with the desired conversions or preprocessing taking place during the course of and as an incident to the transfer. It is a matter of choice as to whether buffering is used, and one skilled in the art will be able to use the "direct transfer with preprocessing" if that alternative is desired.

After the transfer to active (steps 204–223), the buffer values XEP, ZEP, IBUF, KBUF, B$\theta$SL and $BE_s$ appear in the counterpart active memory words XCEP, ZCEP, I, K, $\theta$SL and $E_s$, respectively. Thus, the invention here provides means for and involves a method including
  producing first signals ($\theta$ or B$\theta$SL or $\theta$SL) which numerically represent the desired angular starting location of a lead segment;
  producing second signals (E or $BE_s$ or $E_s$) representing a desired lead ratio; and
  producing third signals (ZEP or ZCEP) representing a desired termination location for the lead segment.
In the present instance, a Z axis position (ZCEP) represents the lead segment termination point. This is equivalent to producing signals representing an angular termination point since the specified ending Z axis position taken with the specified lead ratio defines the end location angle of the segment. That is, if the starting location is OSL, and the ending location is ZCEP for block $B_n$, then the ending location $\theta EL$ is:

$$\theta EL = \theta SL + \frac{K}{E_s} = \theta SL + \frac{ZCEP_{Bn} - ZCEP_{Bn-1}}{E_s} \quad (13)$$

The present invention may therefore be alternatively practiced by including in a G36 block of data the angular ending location $\theta EL$ or deriving signals from block data to represent that location.

The angular extent of any lead segment is indirectly specified by the ending location (ZCEP) and the lead ($E_s$) signaled for any G36 block. The difference between the starting angle $\theta SL$ and the ending angle $\theta EL$ is simply:

$$\text{Angular extent} = \theta EL - \theta SL = (K/E) - \theta SL \quad (13a)$$

and K is signaled as equal to $ZEP - ZEP_p$ per Equation (5), supra.

With the basic signals created in active memory section 56d, short, equal, successive time periods $\Delta T$ are measured off in time and used to execute an "interpolation" sub-routine (FIG. 5 and Table BB) in response to an interrupt created every $\Delta T$ (e.g., every 20 ms.). That interpolation sub-routine for "normal path modes" may be the same as described in Cases A-D, but the instructions held in memory section 56a are set up to create a special procedure when the data signals in active storage represent a lead segment (i.e., have been derived from a "G36" block of a part program). The latter condition is true if the active flag AFL36 is set.

Figure 5:
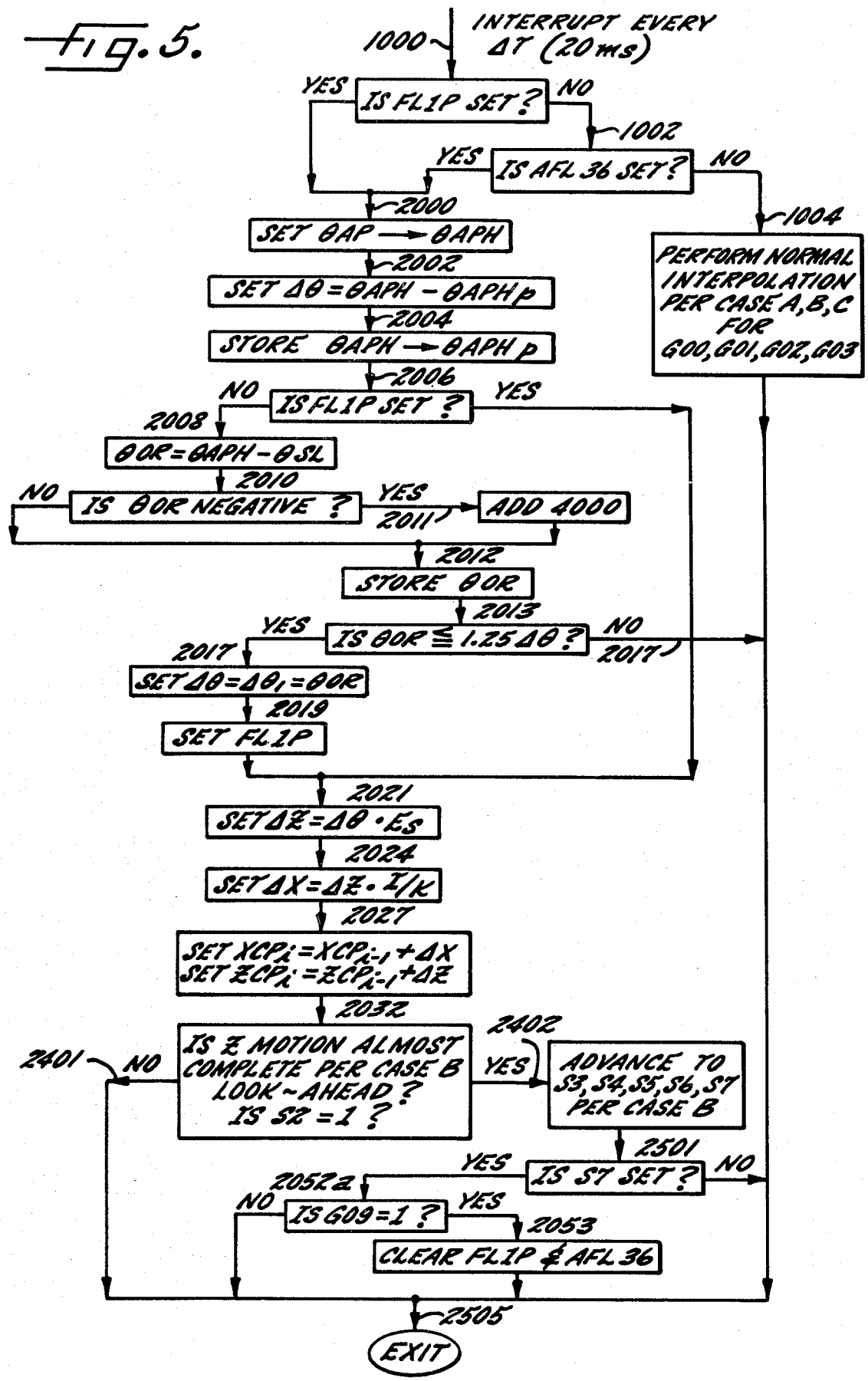
FIG. 5 is a flow chart specifying another portion of the master instruction program contained in the memory of the numerical control director shown in FIGS. 2 and 3 for executing operations in accordance with features of the present invention.

During each $\Delta T$, when the sub-routine of FIG. 5 is entered, a "first pass" flag FLIP is first tested at steps 1000, 1001 (Table BB). As noted below, it will be set if execution of a G36 lead segment is in progress and a "first pass" has been previously completed. If flag FLIP is not set, then on steps 1002, 1003 the AFL36 flag is tested. If it is not set, the data in active storage is not for a lead segment block, and the system proceeds through steps 1004-1999 to perform the normal interpolation for path modes G00, G01, G02 or G03 as described fully in Cases A-D. This results in jumping from step 1199 to exit step 2505.

But if on the first pass through the sub-routine of FIG. 5 the flag FLIP is found cleared but the flag AFL36 is found set, then the system will jump from step 1003 to step 2000. At step 2000, the dynamically changing actual angular position signals $\theta AP$ (in divisions) are read and transferred to a holding register $\theta APH$. The "help" actual position signals are thus updated once per $\Delta T$ (every 20 m.s.) and the difference between two successive values thereof ($\theta APH - \theta APH_p$) represents the angular distance $\Delta \theta$ traveled in one period $\Delta T$. This difference is computed and stored during each pass (every $\Delta T$) at steps 2002-2003 by the computation:

$$\Delta \theta = \theta APH - \theta APH_p \quad (14)$$

Once the "previous position" $\theta APH_p$ has been used to derive $\Delta \theta$ on "this pass", the "present position" $\theta APH$ is stored as the new value of $\theta APH_p$ to be used on the next iteration through the sub-routine. This occurs on steps 2004, 2005.

At step 2006 the first pass flag FL1P is tested to see if the system has already completed the first iteration of the sub-routine in which Z axis motion was begun for an active lead segment block. Assume for the moment that such "first pass with Z motion" has not yet occurred and that flag FL1P has not yet been set. The system at steps 2008-2010 compares (during every $\Delta T$ until a detection is made) the actual angular position of the workpiece with the desired angular starting location for the lead segment. It uses the signals $\theta APH$ and $\theta SL$ to determine when the former become substantially equal to the latter. But exact equality may not occur because on one pass through the sub-routine $\theta APH$ may be less than $\theta SL$, and on the next pass 20 m.s. later $\theta APH$ may be greater than $\theta SL$. Therefore, the signals $\theta APH$ and $\theta SL$ are compared in a fashion to sense when the latter has just exceeded the value of the former as the workpiece angular position changes during each period $\Delta T$. For this purpose, a subtraction is performed and the detection of $\theta APH$ being substantially equal to $\theta SL$ is made by determining when the difference first becomes approximately equal in magnitude to the angular increment $\Delta \theta$ through which the workpiece is moving during each $\Delta T$.

More particularly, on steps 2008-2010 an "overrun" value $\theta OR$ is computed and stored by the procedure:

$$\theta OR = \theta APH - \theta SL \quad (15)$$

The amount $\theta OR$ by which the "actual position" differs from the desired starting location $\theta SL$ is signaled as a positive or negative number in the accumulator (ANS=$\theta OR$) during step 2010. If the sign is negative, then $\theta APH < \theta SL$, but this could mean that $\theta SL$ is small and $\theta APH$ is smaller (no overrun having just occurred) or that $\theta SL$ is larger and $\theta APH$ is smaller (an overrun having just occurred). Thus, if the sign of ANS (i.e., $\theta OR$) is negative, the system proceeds to step 2011 where it adds the positive constant 4000 to produce a re-referenced positive value for the overrun, i.e., $\theta APH - \theta SL$. If the answer is not negative, the system jumps to step 2012. In either event, the signal ANS represents $\theta OR$ as a positive value when step 2012 is reached, and such value is stored at memory location $\theta OR$.

During steps 2012-2015, it is determined whether the positive overrun is less than approximately the workpiece rotation $\Delta \theta$ (computed and stored at step 2003) in a $\Delta T$ interval. Because the rotational velocity of the table may "jitter" slightly from $\Delta T$ to $\Delta T$ a tolerance factor of 25% is employed in sensing when $\theta OR$ is less than or equal to $\Delta \theta$. Thus, at steps 2013, 2014 the signals $\Delta \theta$ are pulled from memory and multiplied by 1.25; then at step 2015 the signals $\theta OR$ are subtracted. The resulting answer ANS will be zero or positive if $$\theta OR \leq 1.25 \Delta \theta \quad (14a)$$

This answer ANS is tested at step 2016; if it is negative, it is known that the workpiece's actual position is angularly displaced (positively or negatively) more than 1.25 $\Delta \theta$ from the commanded starting location $\theta SL$; if it is not negative, it is known that the actual position is equal to, or has just passed, the starting location by less than 1.25 $\Delta \theta$ and by an overrun amount now stored in the $\theta OR$ memory location. Accordingly, a negative answer at step 2016 causes the system to jump to the exit step 2505 and the test here described will be repeated one $\Delta T$ later when the sub-routine of FIG. 5 and Table BB is re-entered. Steps 2017 to 2404 may be by-passed for several iterations of the sub-routine until the test on step 2016 indicates that the actual position and starting location signals are approximately equal.

But if on step 2016 during any iteration, ANS is not negative, then steps 2017–2031 are performed to initiate Z axis (and possibly X axis) motion.

Since the stored overrun number $\theta OR$ may be less than the angular increments $\Delta\theta$ per $\Delta T$ at which the workpiece is rotating; the workpiece may turn less than the previously stored (on step 2003) angular increment $\Delta\theta$ during the first period $\Delta T$ when Z axis motion will first occur. Accordingly, the first increment $\Delta Z$ of Z motion may need to be slightly less than dictated by the value $\Delta\theta$ stored during the previous step 2003 in order to stay on the commanded lead. Therefore, for the "first pass of Z motion", when the workpiece will rotate through an angle $\theta OR$ in a period of $\Delta T$, the number $\theta OR$ (computed and stored on step 2012) is used as the value $\Delta\theta_1$ from which the first Z increment $\Delta Z$ is determined. On steps 2017, 2018 the value $\theta OR$ is pulled from memory and stored as a replacement in the memory location for the signals $\Delta\theta$. Calling that replacement $\Delta\theta_1$, the result is $$\Delta\theta = \Delta\theta_1 = \theta OR = \theta APH - \theta SL \quad (15)$$

It is to be remembered that $\theta OR$ is a re-referenced positive number which has already been found to be less than or equal to the original $\Delta\theta$ (actually in the preferred method, less than 1.25 $\Delta\theta$). The number $\Delta\theta_1$ held in memory location $\Delta\theta$ is now a "first pass" angular increment not necessarily equal to the value $\Delta\theta/\Delta T$ computed and previously stored on step 2003. It is available to be used in determining the "first pass" $\Delta Z$(and $\Delta X$) increments.

On steps 2019 and 2022 the flag FL1P is set; it will remain set to indicate the "first pass" has been completed until the active lead segment block has been fully executed.

On steps 2021–2023, the distance $\Delta Z$ to be moved in one $\Delta T$ is computed, using the signals $E_s$ which represent the desired lead. If the table and workpiece rotate an angle $\Delta\theta$ in one $\Delta T$, and the cutter moves $\Delta Z$ along the Z axis, the lead will be:

$$E_2 = \Delta Z/\Delta\theta \text{ in inches per division} \quad (16)$$

Hence $$\Delta Z = \Delta\theta \cdot E_s \quad (17)$$

This multiplication is carried out and the result $\Delta Z$ stored at step 2023. Actually, more memory cycles may be required to effect multiplication of multi-digit numbers, but the microprogram capability of a computer permits this to be written as one instruction with the operation code "MX".

It may be assumed that when a series of lead segments are to be executed, the cutter has first been brought to an X axis position almost touching but barely free of the workpiece surface. The first lead segment block (unless the groove is to start at one axial end of the workpiece, in which case the cutter is initially brought to an X axis position equal to groove depth) may therefore involve simultaneous X and Z motions so that the cutter reaches desired groove depth (X axis end point XEP) at the same time it reaches the lead segment Z and angular end points (ZEP and $\theta EL$). This "entry in lead" for the first lead segment of a composite groove results in that segment smoothly tapering in depth. To effect this, however, the X axis motion is coordinated with Z axis motion during each period $\Delta T$ such that:

$$\Delta X = \Delta Z \cdot I/K \quad (18)$$

That multiplication is carried out during steps 2024–2026 so that the $\Delta X$ increment values are ready (along with those for $\Delta Z$) for subsequent use. The same procedure is used to back the cutter out of the groove during the final lead segment of a series. Except for the first and last lead segments of a series, the XEP end points will not be changed (unless one wishes to cut a groove which varies in depth), and the quantities I and $\Delta X$ will automatically be zero.

When the lead segment corresponding to the signals in active memory is actually to be cut (because $\theta APH$ has been detected as substantially equal to $\theta SL$ at step 2016), Z axis motion is produced at a rate of $\Delta Z/\Delta T$ (and possibly X axis motion at a rate of $\Delta X/\Delta T$) by the periodic macromove updating of a commanded position number ZCP (and possibly XCP). This is accomplished according to the procedure fully described in Cases A, B, C—and as here indicated at steps 2027 to 2031. That iterative updating procedure is expressed by Equations (2) and (3), supra. The commanded target positions XCP and ZCP will thus progressively change (but will remain constant if $\Delta X$ or $\Delta Z$ is zero) —so that the servo systems to be described will produce the desired X and Z motions coordinated through the lead signals $E_s$ to cut the desired lead segment.

Once Z axis motion has been initiated (and flag FL1P has been set), then as the subroutine of FIG. 5 and Table BB is repeatedly executed, the AFL 36 flag testing at steps 1002, 1003 is skipped because the system jumps from step 1001 to step 2000. Moreover, when the flag FL1P is found set at step 2007, the "first pass" computation of $\theta OR$ and $\Delta\theta_1$ is unnecessary, and a jump takes place to step 2021. Since the sub-routine is executed every $\Delta T$, the computation of $\Delta\theta$ at steps 2002, 2003 is valid to determine angular velocity $\Delta\theta/\Delta T$, and this velocity number may then be used at steps 2021 to 2026 to determine the currently required value of $\Delta Z$, and in turn $\Delta X$. The target position commands ZCP (and possibly XCP) continue to be updated by amounts which keep the cutter "on lead".

The iterations once per $\Delta T$ through the sub-routine of FIG. 5 continue until "look ahead" operations indicate that the Z axis position signals ZCP have become substantially equal to the end point ZCEP (or XCP is substantially equal to XCEP if the X axis is the "fast axis"), at which time the flag signal at S1 advances to S2. Because these "look ahead" operations are fully set out in Cases A and B (see Columns 59 through 64 in Case B), they are not detailed in FIG. 5 and Table BB. Moreover, if G09 deceleration is called for because the active memory flag G09 contains a "1", the determinations of $\Delta Z$ and $\Delta X$ here shown at steps 2021–2026 are modified such that the values $\Delta Z$ and $\Delta X$ progressively decrease from $\Delta T$ to $\Delta T$. Because that function is described in Cases B and D, its details are not here included in steps 2021–2026 but the reader will understand that they occur if the G09 flag is set and the "look ahead" operation determines that the "time to decelerate" point has been reached. It will suffice to say that until the end point look ahead results in signaling that ZCP is approximately equal to ZCEP, the signal S2 remains "0" and the system jumps from step 2401 (Table BB) to the sub-routine exit at step 2505. But when that condition is detected, then signal S1 is cleared to "0" and signal S2 is set to "1", so that steps 2402–2500 are executed to carry out the block transition—with the result that the transition control signal advances from S2 to S7. This may require more than one pass through the FIG. 5 sub-routine, as described in Case A and Case B, so the S7 signal is tested at steps 2501 and 2502. If it is a "0", the system jumps to exit step 2505 but if it is a "1", the system proceeds to step 2052a to determine if the G09 flag signal is a "0" or a "1". In the former case, Z axis motion is to be immediately continued (as explained below with reference to FIGS. 11 and 12) and the system jumps from step 2052b to steps 2504 and 2505. The flags FL1P and AFL 36 remain set, and just as soon as the next block of data is in active memory (by the transfer operations of FIG. 4), the FIG. 5 sub-routine is executed with steps 2008–2020 being bypassed. In this case (when G09 is "0"), it is not necessary to detect when $\theta$APH becomes substantially equal to $\theta$SL, because the starting location of one G36 segment is the ending location of the previous G36 segment.

On the other hand, if at step 2052b, the G09 flag signal is found to be a "1", the system proceeds through steps 2503 and 2503a by which the flags FL1P and AFL 36 are cleared (set to "0"). When the sub-routine of FIG. 5 is next entered, and unless the new active block defines a G36 segment, the system operates normally through steps 1004–1198 and jumps to exit step 2505. If the new active block defines a G36 segment, the flag AFL 36 will be found set at step 1003 and the system will execute steps 2008 et seq. until it is detected that the actual position $\theta$APH has become substantially equal to the new active block starting location $\theta$SL. Until that occurs, the $\Delta$X and $\Delta$Z values remain zero, and a zero-lead groove portion is formed in the workpiece. In other words, if the new and next block brought to the active memory section is a "G36" block, the operations here described will repeat with changed data so that another lead segment will be cut starting at another desired angular location on the workpiece, the next segment immediately following the previous one if the G09 flag was not "1" at step 2052b.

In view, it has been noted above that when each block of lead segment part program data is in buffer storage (and when it is moved into active storage) first, second and third signals $\theta$SL, $E_s$ and ZCEP are produced to represent (a) a desired angular starting location of a lead segment, (b) a desired lead ratio, and (c) a desired ending location (which determines the extent of the segment). Thereafter, as successive periods $\Delta$T are measured off, fourth signals $\theta$APH are created during each period $\Delta$T to represent the sensed actual angular position of the workpiece relative to the bearing of the cutter (i.e., a radius normal to the rotational axis and along which the cutter 14 of FIG. 1 lies). During each period $\Delta$T, the first and fourth signals are compared to determine when the latter become substantially equal to the former. While this may be accomplished in various ways, the apparatus and method embodiment disclosed as an example here computes an overrun number $\theta$OR=$\theta$APH−$\theta$SL each period $\Delta$T and detects when a positive value thereof first becomes less than $\Delta\theta$ per $\Delta$T (or, in preferred practice, less than 1.25 $\Delta\theta$).

Then and only then is the Z axis motion initiated. That motion is created by producing fifth signals $\Delta\theta$ during each period $\Delta$T to represent the angular change in the workpiece position in a time span of one $\Delta$T. The second and fifth signals $E_s$ and $\Delta\theta$ are utilized to move the cutter along the Z axis by a distance $\Delta$Z each period $\Delta$T, where $\Delta Z = \Delta\theta \cdot E_s$. This is accomplished by updating the Z commanded position signals ZCP (used in the final Z servo control) by the amount $\Delta$Z during each period $\Delta$T.

During the execution of the first and/or last block of a succession of "G36" lead segment blocks, such first or last blocks containing X axis data calling for an X displacement I other than zero, the cutter moves along the X axis simultaneously and in coordination with the Z axis motion. Sixth signals are created to represent the displacement I. The second, fifth and sixth signals are utilized to move the cutter a distance $\Delta$X during each $\Delta$T, where $\Delta X = \Delta Z \cdot (I/K) = \Delta\theta \cdot E_s \cdot (I/K)$. This makes the cutter enter in lead to a desired groove depth, or retract from the groove. That is, the first and/or last segment of a succession of lead segments are smoothly and uniformly tapered in depth.

Once execution of a lead segment block has begun, it is terminated by cessation of the $\Delta$Z (and $\Delta$X) updating of the position command signal ZCP (and XCP) by comparing the third signals (ZCEP) with the servo command signals (ZCP)—to determine when they become approximately equal. The "look ahead" procedure of Cases A and B involves this comparison; and when the substantial equality is detected the signal S2 appears so that the repeated iterations through the sub-routine of FIG. 5 are stopped. Since cutter motion along the Z (and X) axis ceases when the cutter reaches the programmed cutter position ZCEP, the physical segment terminates after the Z axis has moved by a distance $K = ZEP − ZEP_p$ and the workpiece has rotated through an angle equal to $K/E_s$.

After Z motion (and any X motion) for a given lead segment ceases, the cutter will simply remain stationary, while the table and workpiece continue to turn, unless the next succeeding part program block calls for Z and/or X movement immediately. Because of this, a zero lead segment will automatically be cut in the workpiece from the ending location of one programmed lead segment to the starting location of the next programmed lead segment. Thus, zero lead segments may advantageously be interspersed between successive lead segments and without the need of a separate part program block for each zero lead segment. Those zero-lead segments are formed automatically when the G09 code is included in a first block of G36 data and the next block command a starting location $\theta$SL displaced from the first block's ending location. But if a G09 code is absent from a first block of G36 data, the system will execute the following block immediately because the second segment's starting location is the same as the first segment's ending location.

F. Final Servo Motion Control

Whenever the commanded position signals XCP or ZCP change as a result of the operations described above for a "G36" lead segment block of program data, they are used according to the teachings of Case C to energize the motors MX and MZ such that the X and Z axis positions of the cutter 14 track with "soft servo" action. This is desirable because at the start of a lead segment the values of $\Delta$Z and $\Delta$X will jump from zero to some finite value and the position command signals may change by appreciable amounts calling for axis accelerations. At the end of a lead segment the values of ΔZ and ΔX will change from finite values to zero unless the succeeding block of data calls for immediately continued motion along the Z or X axes. In the case where two successive lead segments are to be separated by a zero-lead portion, automatic "deceleration to zero" is executed as taught in Cases B and D. Where motion continues immediately after the end of one lead segment the deceleration or acceleration is not so extreme that it cannot be tolerated with sufficient accuracy when the servo control method of Case C is used.

FIGS. 6 and 7 herein are substantively identical to FIGS. 5 and 6 of Case C and differ only in omitting the Case C optional features of (a) automatically balancing or removing servo offsets and (b) carrying over the remainder digits as numbers XVCR and ZVCR which are described in Case C. Thus master program listings for the flow charts of present case FIGS. 6 and 7 are unnecessary and not included in the present specification except by cross-reference incorporation of the Table I and II as they appear in Case C. Specifically, steps 106–113 and 122–129 may be omitted from that Table I, and it will then constitute a flow chart corresponding to present FIG. 6—to set out a sub-routine entered at ΔT (20 ms.) interrupt intervals. Likewise, steps 9–11 and 20–22 may be omitted from Table II of Case C and that table will then substantively (recalling that "Z" is substituted for "Y" throughout) represent a sub-routine corresponding to present case FIG. 7 and entered by an interrupt every ΔT/10 or 2 ms.

The present embodiment of the invention thus preferably uses the position command signals XCP and ZCP produced when a lead segment block is executed to signal lags XLAG and ZLAG between XCP and ZCP on the one hand and secondary command signals XSCP and ZSCP. See the operations at 80 and 81 in FIG. 6 which are performed, as a result of the master instructions in memory section 56a, during each period ΔT after the signals XCP and ZCP have been updated according to FIG. 5.

Also during each period ΔT, servo increments are computed and signaled:

$$\Delta XS = GF \cdot XLAG \quad (19)$$

$$\Delta ZS = GF \cdot ZLAG \quad (20)$$

See the representations at 82 and 83 in FIG. 6. Feedforward numbers XFDFD and ZFDFD are computed and signaled during each period ΔT as explained in Case C and shown at 84 and 85 in present FIG. 6.

A micromove subroutine is entered during each shorter interval ΔT/N, e.g. 2 m.s. as explained in Case C and shown in present FIG. 7. The X and Z secondary command signals are incremented by amounts ΔXS/10 and ΔZS/10 as illustrated at 86 in FIG. 7 to form current values of XSCPM and ZSCPM. Errors XPER and ZPER are signaled and stored (at 87 in FIG. 7) each 2 m.s. using the actual position signals XAP and ZAP created by the digitizers 35 and 36 (FIGS. 1 and 3). Then, the final velocity commands XVC and ZVC are derived from the errors XPER and ZPER (with gain factors PGX and GPZ) and the feed forward signals XFDFD and ZFDFD (as shown at 88 in FIG. 7). These numbers are "written" into memory locations XVC and ZVC and continuously fed therefrom to the convertors 45 and 46 (FIGS. 1 and 3)—so that the motors MX and MZ act to keep the cutter moving in agreement with the changing position commands—all as described in Case C.

G. Exemplary Groove Configurations

The "part program" of Examples I and I' set out above shows how a composite groove of four lead segments LS1-4 separated by zero lead segments (FIG. 13) may be formed on the outer surface of a cylindrical workpiece—by preparing only a few blocks of program data. The resulting workpiece might be desired and usable, for example, as a circular cam to convert rotational motion into linear motion imparted to a follower riding in the groove. It may be mentioned that a groove of desired depth may, of course, be formed by a succession of shallow cuts or bites taken by the cutter. To produce a second pass of the cutter in the groove of FIG. 13, it is only necessary that the cutter be returned to Z axis height of 10.50", moved to a starting X location of 13.33 and then controlled by repeating BLKS 2-6 of Example I'.

Figure 8:
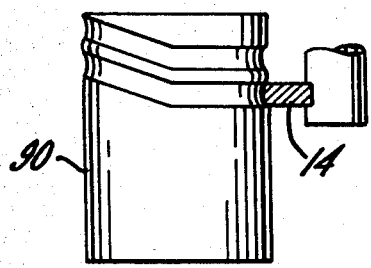
FIG. 8 is an elevational view of an exemplary workpiece machined to form cable drum grooves of the type disclosed and described in Le Bus U.S. Pat. No. 2,620,996.
Figure 8A:
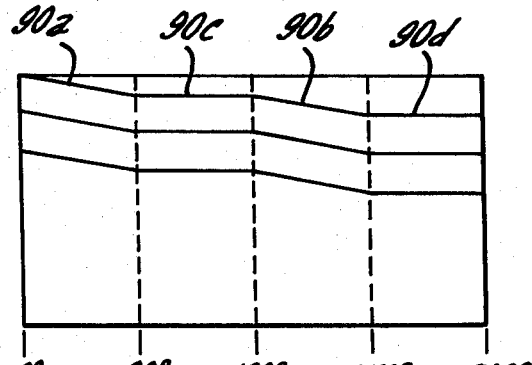
FIG. 8A is a developed view of the surface of the workpiece shown in FIG. 8.

A similar groove is shown being formed in a cylindrical workpiece 90 (FIG. 8) whose developed surface is illustrated in FIG. 8A. Each groove portion of 360° includes two lead signments 90a, 90b of 90° extent and two interspersed zero lead segments 90c, 90d of 90° extent. Each 360° portion follows the preceding one, so that a helical composite groove is formed with what may be termed an "interrupted thread". To machine a cable drum usable to advantageously take in cable as described in LeBus U.S. Pat. No. 2,620,996, the cutter would first be brought just to the upper surface of a drum assumed to be at location Z=20 (i.e., the workpiece in FIG. 1) and to an X axis position corresponding to the desired "bottom" of the groove. The table 12 would be conditioned so it is driven at a desired angular speed S. The necessary succession of part program blocks would be (if a lead of 2 inches per revolution in the segments were desired):

| BLK1 | G36 | E2 | θ0   | ZEP 19.5 | G90 |
|------|-----|----|------|----------|-----|
| BLK2 |     |    | θ180 | ZEP 19.0 | G09 |
| BLK3 |     |    | θ0   | ZEP 18.5 | G09 |
| BLK4 |     |    | θ180 | ZEP 18.0 | G09 |
| BLK5 |     |    |      | ZEP 17.5 | G09 |

That sequence may be repeated for as many 360 degree helical groove portions as are desired. While each "revolution" of the quasi-helical groove contains two lead segments and two zero-lead segments, it requires only two blocks, each with a G09 code so that Z axis motion terminates at the end of each lead segment to start a zero-lead portion in the groove. Each lead segment 90a or 90b has a lead of 2 inches per revolution (and since it extends 0.5 inches in a Z direction, an angular extent of 90 degrees) but entire quasi-helical "interrupted thread" has an effective lead of 1 inch per revolution.

Figure 9:
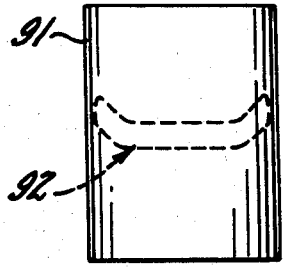
FIGS. 9 and 9A are elevation and developed views, respectively, of a typical workpiece which may be machined according to the methods and with the apparatus of the present invention, such workpiece in this instance being a cylindrical bearing having an oil groove formed in its inner surface.
Figure 9A:
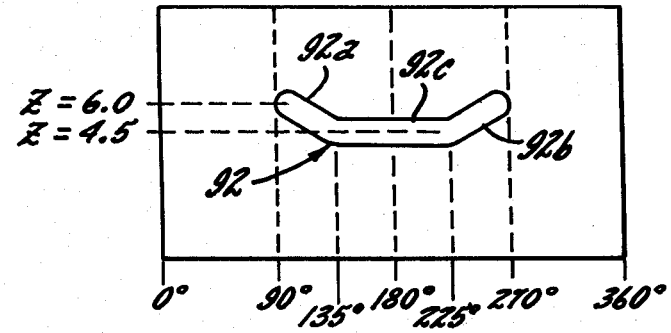

FIGS. 9 and 9a illustrate another typical workpiece 91 and its developed interior surface. In this instance, the workpiece is intended for use as a sleeve bearing with an oil-retaining groove 92 in its interior surface extending angularly over 180° and axially over a total span of 1.5 inches. With the cutter disposed inside of the workpiece, the following sequence of lead segment part program blocks will produce the desired workpiece (assuming that the cutter extends from left toward the right in FIG. 1 and that the inner wall of the workpiece resides at an X axis position of 14.60"):

| BLK1 G00 | | | ZEP 6.0 | XEP 14.6 | G90 S10 |
|---|---|---|---|---|---|
| BLK2 G36 | E12 | θ90 | ZEP 4.5 | XEP 14.7 | G09 |
| BLK3 | | θ225 | ZEP 6.0 | XEP 14.6 | G09 |
| BLK4 G00 | | | | XEP 14.0 | |

Blocks BLK1 and BLK4 are merely to bring the cutter to initial and final positions. The two "G36" blocks BLK3 and BLK4 will result in the desired oil groove being cut with a depth of 0.1" in the zero lead segment 92c but tapering into and out of that depth in the two lead segments 92a and 92b. This example illustrates that the "leads" of successive segments may be of different directions, the segment 92a extending downwardly and the segment 92b upwardly as viewed in FIGS. 9 and 9A.

Figure 10:
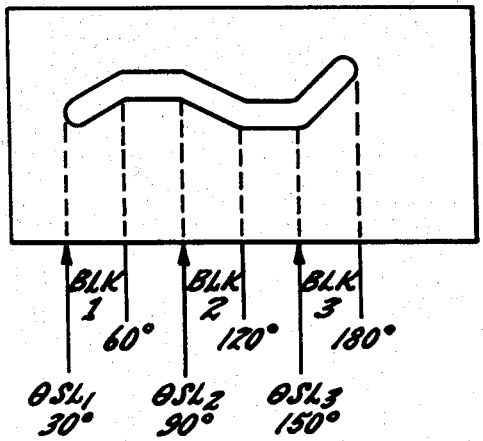
FIG. 10 is a developed view of the surface of a cylindrical workpiece having a groove machined therein which is less than 360 degrees in angular extent and consisting of connected lead segments of different lead ratios, such groove being illustrative of the flexibility which is provided by the present invention.
Figure 11:
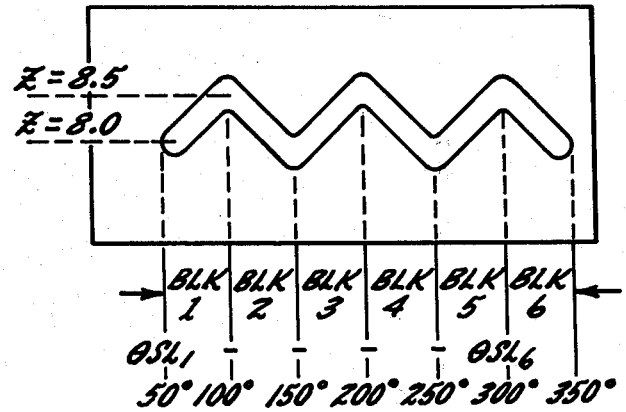
FIG. 11 is a developed view of the surface of another cylindrical workpiece machined with an exemplary groove by the practice of the present invention according to a particular but typical succession of part program lead segment data blocks.
Figure 12:
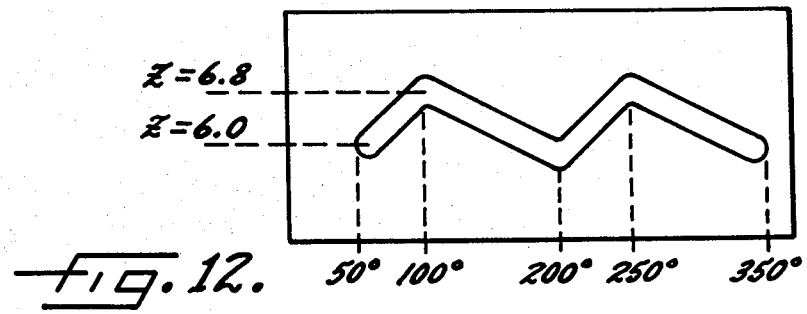
FIG. 12 is similar to FIG. 11 but illustrates the developed surface of a workpiece formed with another specific groove created according to another typical sequence of lead segment part program blocks in the practice of the present invention.

Other composite grooves of less than 360 degrees in total extent are illustrated in FIGS. 10, 11 and 12 which are developed views of cylindrical workpiece surfaces. Neglecting the preliminary operations to bring the cutter initially adjacent the workpiece surface and to withdraw it therefrom, the following simple part program sequences may be used:

| For FIG. 10 Example | | | | | |
|---|---|---|---|---|---|
| BLK1 G36 | E1 | θ30 | K + .0833 | I − 0.05 | G91 G09 |
| BLK2 | | θ60 | K − .0833 | | G09 |
| BLK3 | E2 | θ60 | K + 1.66 | I + 0.05 | G09 |
| For FIG. 11 Example | | | | | |
| BLK1 G36 | E3.6 | θ50 | ZEP 8.5 | XEP 11.9 | G90 |
| BLK2 | | | ZEP 8.0 | | |
| BLK3 | | | ZEP 8.5 | | |
| BLK4 | | | ZEP 8.0 | | |
| BLK5 | | | ZEP 8.5 | | |
| BLK6 | | | ZEP 8.0 | XEP 12.0 | G09 |
| For FIG. 12 Example: | | | | | |
| BLK1 G36 | E5.76 | θ50 | ZEP 6.8 | XEP 11.9 | G90 |
| BLK2 | E2.88 | | ZEP 6.0 | | |
| BLK3 | E5.76 | | ZEP 6.8 | | |
| BLK4 | E2.88 | | ZEP 6.0 | XEP 12.0 | |

Note:
It is assumed for FIGS. 11 and 12 that the work surface is at X = 12.0 and groove is cut to 0.10" depth.

FIG. 10 and the part program example therefor illustrate that successive lead segments, separated by zero lead segments, need not have the same leads. The lead segments for BLK1 and BLK2 have lead ratios of 1"/rev., but the lead segment for BLK3 has a lead ratio of 2"/rev. Also, successive lead segments need not be of the same angular extent nor be separated by zero-lead segments which are of equal angular extent, but that happens to be true in the example of FIG. 10.

FIGS. 11 and 12 show what may be loosely termed "wavy grooves" and confirm that it is not necessary for successive lead segments to be separated by zero-lead groove portions. G09 codes are not used for automatic deceleration to zero velocity in the exemplary part programs for FIGS. 11 and 12 because when Z axis motion ends for one segment it is to be immediately resumed (here, in the opposite direction) for the next segment. If, as in FIGS. 11 and 12, the starting location of one lead segment is desired to be the same as the ending angular location of the preceding lead segment, then except for some slight rounding, the lead segments are formed head-to-toe so to speak. Since the starting location θSL for the BLK2 segment is the same as the ending location for the BLK1 segment (and this is true for BLK2-3, BLK3-4 and so on) it is not necessary for the second block of data in each head-to-toe pair to contain a programmed starting location number θ, nor produce a new number in the memory word θSL. As explained previously, when the G09 code is absent, this means that the next succeeding groove portion is to be cut as a lead segment (and not as a zero-lead portion) so that when the first segment of a pair is completed the flags FL1P and AFL36 are not cleared. As the next block of G36 data is transferred to the active memory section, it is known that the cutter is then at the end of the first segment and thus at the starting location for the second segment of the pair. Accordingly, the test to determine when θAPH becomes substantially equal to θSL is not required, and on the first iteration of the sub-routine of FIG. 5 (and Table BB) with the second segment data in active memory, the steps 2008-2020 are simply bypassed because the flag FLIP is still set. Therefore, ΔZ (and perhaps ΔX) are finite and act to increment ZCP (and perhaps XCP) during that very first iteration of the FIG. 5 sub-routine for the second segment. But because the active memory data for the second segment of a pair may contain values of E or ZCP or XCP which are changed from those for the first segment, the lead and/or the direction (+Z or −Z) and/or the angular extent of the second segment may be different from that of the first segment of a pair.

It will be understood, therefore, that the program data blocks set out above for the examples of FIGS. 11 and 12 need only contain a starting location word or value θ for the first segment of a succession of head-to-toe pairs. When one segment is completely cut, the cutting of the second immediately begins although with a changed direction and/or lead. By changing the direction of Z axis motion from one G36 block to the next (as in the examples of FIGS. 11 and 12) the sign of the lead ratio is, in effect, reversed from segment-to-segment so that the wavy configuration is created. In FIG. 11, all of the segments are of equal lead and angular extent; but FIG. 12 shows the ease with which from block-to-block the lead ratio and/or the angular extent may be changed. Whereas the lead ratio for the first and third segments in FIG. 12 is 5.76"/rev., it is 2.88"/rev. for the second and fourth segments The extent of the first and third segments is 50°, whereas it is 100° for the second and fourth segments.

H. Axis Swapping To Machine Grooves In Surfaces Transverse To The Axis Of Rotation Thus far the methods and apparatus of the present invention have been described with references to cutting or forming lead segments (with or without intervening zero-lead portions) in surfaces of revolution on workpieces rotationally driven with the table 11 (FIG. 1) about a rotational axis in a turning machine. The "surfaces of revolution" (here called "cylindrical " for brevity) may be arcuate in the sense that they do not extend fully 360° around the workpiece and they may be tapered or inclined in the sense of the surfaces of a cone rather than a true cylinder.

But the invention here disclosed has the further surprising and advantageous capability of cutting or forming "lead segments" in the end faces or flanges, which lie generally in a plane tranverse to the rotational axis 12, of a rotationally driven workpiece. The most apparent example of what will here be called a "transverse surface" is the upper end face of a solid cylindrical workpiece mounted axially upright on the table 11 of FIG. 1; another example is a spool-shaped workpiece having axially spaced flanges, with each flange having an upper and lower surface lying in a horizontal plane normal to the axis of rotation 12. Now if the cutter 14 of the turning machine is first brought to a Z axis position such that it will cut to a desired depth (say, 0.1") as it engages such a "transverse surface" of a workpiece, and if the X axis (rather than Z axis) motion is coordinated with the table and workpiece rotational motion, then a "lead segment" may be machined in that transverse surface. If the segment is to start at an angular location of, say, 30° on the workpiece a starting location of θ30 may be contained in a G36 part program block. If the segment is to have a "lead" of 2"/rev., a work E2 may be contained in that block. And if the segment is to have an angular extent of 45°, an X axis end point XEP may be contained in that block to define the X axis departure as 0.25".

When such a block of part program data is signaled in the computer memory 56, it is only necessary that all signals for the X axis be swapped for those of the Z axis—and the cutter will form a "lead segment" in the transverse surface which is "inclined" radially or spiraled at a slope or lead of 2"/rev. and extending from a 30° location to a 75° location on the workpiece. In other words, the present invention may here be practiced exactly as described above but with all X and Z axis data and signals swapped when any composite groove with one or more radial lead segments is desired in a transverse surface on a workpiece. The composite groove may be easily programmed to include zero-lead portions interspersed between lead segments or it may have head-to-toe connected lead segments. Each lead segment may have a predetermined angular starting location, lead ratio, and extent (the angular extent being determined conjointly by the X axis departure or extent taken with the lead ratio). The first and last segments of a succession (or indeed others within the succession) may be tapered in depth by causing Z axis motion to occur simultaneously with the primary X axis motion.

This alternative practice of the invention for machining lead segments in "transverse surfaces" will be so readily understood, and the swapping of X and Z data and signals is so straightforward, that further details and description here would only needlessly lengthen the present specification. And, to avoid unnecessary multiplicity of the claims which follow, each is intended to cover, and is here designated as covering, the equivalent method or apparatus applied to the machining of lead segments in transverse surfaces of workpieces rotationally driven in a turning machine. Thus, in construing the claims each is to be taken as embracing also a "transverse surface" when a cylindrical surface is mentioned, to refer to the X or Z axis when a Z or X axis is mentioned, and to refer to X or Z signals when Z or X signals are mentioned. The claims are here presented as generically covering "swapping" of "transverse surface" for "cylindrical surface", of X for Z, and Z for X even though they directly define steps or elements by which Z axis motion is primarily controlled in relation to angular motion and positions of the rotating workpiece.

Resume'

From the foregoing description, it can now be appreciated that the invention brings to the numerical control art a new mode or class of control for turning machines. It differs from known "threading" modes in that the starting location, ending location and lead may be predetermined for each individual lead segment, although of course the ending angular location depends jointly upon the chosen lead ratio and the total Z axis departure. But in consequence of this capability, and in distinction from threading as known in the art, a plurality of lead segments—either directly adjoining or separated by zero-lead segments—may be formed within an angular span of 360 degrees or less. The zero-lead segments require no separate program blocks, and the successive blocks of program data are simple to prepare with relatively few alpha-prefix words.

The applications of this new class of control action are many. As a few examples, it may be used to form cable drum with quasi-helical grooves wherein each 360 degree span includes both lead and non-lead ("straight") segments. It may be used to cut slots or grooves in cylindrical cams, and with almost any configuration desired to relate cam follower axial position to the cam's rotational position. Indeed, it may be used to form oil grooves of desired configurations in bearing sleeves. Other advantageous applications will no doubt be apparent to the reader.

There follow on the terminal pages of this specification the Tables AA and BB to which reference has been made above.

TABLE AA

| | Generalized Listing of Instruction Steps for FIG. 4 | |
|---|---|---|
| STEP | OPERATION | COMMENTS |
| (a) | Enter when S7 = 1 | Per Cases A & B, present active block complete |
| 100 | CAR, Read BFL36 | |
| 101 | If ANS = 1, jump to step 204 | |
| 102 | Complete Active Block & Transfer Buffer to Active Per Modes 2 & 3 of Cases A & B. This advances S7 to S8 to S9 | As described in Cases A & B |
| 199 | | |
| 200 | CAR, Read $k_1$ | |
| 201 | MX Read S | ANS = $k_1 \cdot S$ |
| 202 | Write θVC | Table servo drives table at S r.p.m. |
| 203 | Jump to Step 224 | |
| 204 | CAR, Read "1" | Transfer of a G36 Block From Buffer to Active Begins; Flag ANS 36 |

TABLE AA-continued
Generalized Listing of Instruction Steps for FIG. 4

| STEP | OPERATION | COMMENTS |
|---|---|---|
| 204a | Write AFL 36 | is set |
| 205 | CAR, Write G | G00, G01, G02, G03 is cleared from G Reg. |
| 206 | Read IBUF | |
| 207 | Write I | |
| 208 | CAR, Read KBUF | |
| 209 | Write K | |
| 210 | CAR, Write S7 | S7 signal cleared |
| 211 | Read "1" | |
| 212 | Write S8 | S8 signal appears |
| 213 | CAR, Read XEP | |
| 214 | Write XCEP | Buffer signals are transferred to active memory |
| 215 | CAR, Read ZEP | |
| 216 | Write ZCEP | |
| 217 | CAR, Read BθSL | |
| 218 | Write θSL | |
| 218a | CAR, Read $BE_s$ | |
| 218b | Write $E_s$ | |
| 219 | CAR, Write ΔX | ΔX, ΔZ and S8 are set to zero |
| 220 | Write ΔZ | |
| 221 | Write S8 | |
| 222 | Read "1" | |
| 223 | Write S9 | S9 signal appears |
| 224 | Transfer the next-up | |
| \| | block from part program storage | |
| \| | (memory section 56b or punched | As described in Cases A & B |
| \| | tape) to buffer words. If Code | |
| \| | G90 or G91 is received, set or | |
| 299 | clear FL90. Advance S9 to S1 | |
| 300 | CAR, Read GB | |
| 301 | SX, read constant 36 | |
| 302 | If ANS = 0, jump to step 381 | |
| 302a | Clear flag BFL36 if ANS = −36, −35, −34 or −33 | This block is for a standard mode |
| 303 | Pre-process Buffer Block Data for Standard Path Modes | As described in Cases A and B |
| \| | | |
| 380 | Jump to step 414 | |
| 381 | Read "1" | |
| 382 | Write BFL 36 | Flag BFL 36 is set |
| 383 | CAR, Read FL90 | |
| 384 | If ANS = 0, jump to step 396 | Block data is incremental format |
| 385 | CAR, Read XEP | Form IBUF and KBUF from |
| 386 | SX, Read $XEP_p$ | absolute position words XEP and |
| 387 | Write IBUF | ZEP, using end point positions of |
| 388 | CAR, Read ZEP | previous block |
| 389 | SX, Read $ZEP_p$ | |
| 390 | Write KBUF | |
| 391 | CAR, Read $k_2$ | |
| 392 | MX, Read θ | Scale θ in degrees to BθSL in divisions |
| 393 | Write BθSL | BθSL = $k_2 θ$ = 11.111θ |
| 394 | No OP | |
| 395 | Jump to step 406 | |
| 396 | Read $XEP_p$ | Form XEP and ZEP from |
| 397 | Read IBUF | incremental-displacement words |
| 398 | Write XEP | IBUF and KBUF, using end point |
| 399 | CAR, Read $ZEP_p$ | positions of previous block |
| 400 | Read KBUF | |
| 401 | Write ZEP | |
| 402 | CAR, Read $k_2$ | Form absolute BθSL in divisions |
| 403 | MX, Read θ | from incremental θ number in |
| 404 | Read $BθS_p$ | degrees. |
| 405 | Write BθSL | BθSL = $BθSL_p + k_2 \cdot θ$ |
| 406 | Write $BθSL_p$ | Save BθSL as next $Bθ_p$ |
| 407 | CAR, Read $k_4$ | |
| 408 | MX, Read E | Scale E to $BE_s$ in inches/division |
| 409 | Write $BE_s$ | $BE_s = k_4 E$ |
| 410 | CAR, Read XEP | |
| 411 | Write $XEP_p$ | Save present end points for |
| 412 | CAR, Read ZEP | later use as previous |
| 413 | Write $ZEP_p$ | end points |

TABLE AA-continued

Generalized Listing of Instruction Steps for FIG. 4

| STEP | OPERATION | COMMENTS |
|---|---|---|
| 414 | Exit until next entry | |

Note:
This program may be interrupted at various points by the sub-routine of Table BB
Symbol CAR designates "clear accumulator register" (set ANS = 0)
Symbol ANS refers to output signaled by accumulator 54
Symbols SX, MX, and DX respectively designate "subtract", "multiply" and "divide" operation codes to ALU. Absence of any ALU operation designates add incoming operand to ANS and signal the sum as new ANS.
"Read" means bring a signaled word from its storage to ALU input.
"Write" means transfer ANS to designated storage word address.

TABLE BB

Generalized Listing of Instruction Steps For FIG. 5

| STEP | OPERATION | COMMENTS |
|---|---|---|
| (a) | Enter on every $\Delta T$ by interrupt | |
| 1000 | CAR, Read FL1P | |
| 1001 | If ANS = 1, jump to step 2000 | |
| 1002 | CAR, Read AFL 36 | |
| 1003 | If ANS = 1, jump to step 2000 | |
| 1004 | Perform standard | |
| | motion interpolation | The motion is G00, G01, G02 |
| | per Cases A, B, C | or G03 mode |
| 1198 | | |
| 1199 | Jump to step 2505 | |
| 2000 | CAR, Read $\theta AP$ | |
| 2001 | Write $\theta APH$ | Hold sampled value of $\theta AP$ |
| 2002 | SX, Read $\theta APH_p$ | |
| 2003 | Write $\Delta\theta$ | $\Delta\theta = \theta APH - \theta APH_p$ |
| 2004 | CAR, Read $\theta APH$ | |
| 2005 | Write $\theta APH_p$ | Save this $\theta APH$ as $\theta APH_p$ for next iteration |
| 2006 | CAR, Read FL1P | |
| 2007 | If ANS = 1, jump to step 2021 | |
| 2008 | CAR, Read $\theta APH$ | Start first pass $\Delta\theta$ determination |
| 2009 | SX, Read $\theta SL$ | ANS = $\theta OR$ = $\theta APH - \theta SL$ |
| 2010 | If ANS is not negative, jump to step 2012 | |
| 2011 | Read Constant 4000 | ANS now represents positive $\theta OR$ |
| 2012 | Write $\theta OR$ | Store $\theta OR$ |
| 2013 | CAR, Read $\Delta\theta$ | |
| 2014 | MX, Read Constant 1.25 | ANS = 1.25 $\Delta\theta$ |
| 2015 | SX, Read $\theta OR$ | ANS = 1.25 $\Delta\theta$ - $\theta OR$ is negative if $\theta OR > 1.25 \Delta\theta$ |
| 2017 | If ANS is negative, jump to step 2505 | |
| 2017 | CAR, Read $\theta OR$ | |
| 2018 | Write $\Delta\theta$ | $\Delta\theta$ now equals first pass angular increment $\Delta\theta_1 = \theta OR$ |
| 2019 | CAR, Read "1" | |
| 2020 | Write FL1P | Set flag FL1P |
| 2021 | CAR, Read $\Delta\theta$ | |
| 2022 | MX, Read $E_s$ | |
| 2023 | Write $\Delta Z$ | ANS = $\Delta Z = \Delta\theta \cdot E_s$ |
| 2024 | MX, Read I | |
| 2025 | DX, Read K | |
| 2026 | Write $\Delta X$ | ANS = $\Delta X = \Delta Z \cdot I/K$ |
| 2027 | Read $XCP_{i-1}$ | |
| 2028 | Write XCP | ANS = XCP = $XCP_{i-1} + \Delta X$ |
| 2029 | CAR, Read $\Delta Z$ | |
| 2030 | Read $ZCP_{i-1}$ | |
| 2031 | Write ZCP | ANS = ZCP = $ZCP_{i-1} + \Delta Z$ |
| 2032 | Perform Case A and B | |
| | Look-Ahead to Detect This | |
| | Segment Completion. | See Columns 59 to 64 in |
| | When ZCP ≅ ZCEP, | Case B |
| | S1 advances to S2. | |
| 2400 | CAR, Read S2 | |

TABLE BB-continued
Generalized Listing of Instruction Steps For FIG. 5

| STEP | OPERATION | COMMENTS |
| --- | --- | --- |
| 2401 | If ANS = 0, jump to step 2505 | |
| 2402 | Complete transition and advance | |
| ⋮ | S2 to S7 | |
| 2500 | Per Case A & B | |
| 2501 | CAR, Read S7 | |
| 2502 | If ANS = 0, jump to step 2505 | |
| 2052a | CAR, Read G09 | |
| 2052b | If ANS = 0, jump to 2504 | |
| 2503 | CAR, write FL1P | Clear flag FL1P |
| 2503a | Write AFL 36 | Clear flag AFL 36 |
| 2504 | Start entry of Table AA Routine | |
| 2505 | Exit until next ΔT interrupt | |

We claim:

1. The method of cutting a lead segment in the cylindrical surface of a workpiece driven relative to a cutter about a rotational axis (herein called the θ axis) in a turning machine responsive to (i) first signals designating the θ axis starting location for the segment, (ii) second signals designating the desired lead ratio for the segment, and (iii) third signals designating Z axis ending location for the segment, the machine having means for driving the cutter relative to the workpiece along X and Z axes which lie respectively normal and parallel to the rotational axis, said method comprising (1) producing fourth signals which dynamically represent the θ axis actual position of the workpiece, (2) measuring off successive equal time periods ΔT, (3) using the first and fourth signals to detect when the θ axis actual position becomes substantially equal to the segment starting location, (4) producing command signals representing the command position of the cutter along the Z axis, (5) in response to and after said detection, using said fourth and second signals to change said command signals during each period ΔT by an amount proportional to the product of (i) the desired lead ratio and (ii) the amount by which the θ axis position has changed in the time span of one ΔT, and (6) terminating said step (5) when said command signals become approximately equal to said third signals, (7) using said command signals to actuate the Z axis driving means so as to keep the Z axis actual position substantially in agreement with such command signals.

2. The method of cutting a lead segment of predetermined angular location, lead and extent on a workpiece in a turning machine, the latter machine including means for driving the workpiece relative to a cutter about a rotational axis and means for moving the cutter relative to the workpiece along Z and X axes which lie respectively parallel and normal to the rotational axis, said method comprising the steps of (1) producing for one segment definition (a) first signals (θSL) representing the desired angular starting location of that segment, (b) second signals (E) representing the desired lead ratio, and (c) third (ZCEP) signals representing the desired axial location at which the segment is to terminate, (2) measuring off successive, short equal time periods ΔT, (3) during each period ΔT, producing fourth signals (θAP) representing the actual angular position of the workpiece relative to the bearing of the cutter, (4) during each period ΔT at least until detection is made, comparing said first and fourth signals (θSL and θAP) to detect when the latter become substantially equal, (5) during each period ΔT at least after said detection is made, determining and producing fifth signals (Δθ) representing the then existing angular velocity of the workpiece in units of Δθ/ΔT, (6) in response to and after the detection made as a result of said step (4), utilizing said second and fifth signals to move the cutter along the Z axis at a rate of $\Delta Z = \Delta \theta \cdot E$ per period ΔT, (7) detecting when the movement of the cutter has brought it approximately to the position represented by said third signals (ZCEP), and (8) in response to the detecting achieved in said step (7), terminating the execution of the aforesaid step (6).

3. The method of cutting successive but not necessarily contiguous lead segments each of preselectable and predetermined angular location, lead and extent on a workpiece in a turning machine, the latter machine including means for driving the workpiece relative to a cutter about a rotational axis and means for moving the cutter relative to the workpiece along Z and X axes which respectively lie parallel and normal to the rotational axis, said method comprising the steps of (1) storing a plurality of successive blocks of lead segment data each including numerical representations of (a) a desired angular starting location, (b) a desired lead ratio, and (c) a desired Z axis termination location or Z axis displacement, (2) bringing from storage, when a given lead segment is to be executed, the corresponding segment data block and utilizing the same to produce (a) first signals (θSL) representing the desired angular starting location, (b) second signals (E) representing the desired lead ratio, and (c) third signals (ZCEP or K) representing the desired Z axis termination location or displacement, (3) measuring off successive, short equal time periods ΔT, (4) during each period ΔT, producing fourth signals (θAP) representing the actual angular position of the workpiece relative to the bearing of the cutter, (5) during each period ΔT at least until the detection is made, comparing said first and fourth signals to detect when the latter become substantially equal to one another, (6) during each period ΔT after said detection occurs, determining and producing fifth signals (Δθ) representing the incremental angle moved by the workpiece in a time span of one ΔT, (7) in response to and after said detection occurs, utilizing said second and fifth signals to move the cutter along the Z axis by a distance ΔZ equal to the product Δθ·E during each period ΔT, (8) terminating the moving of said step (7) when the Z axis location or displacement becomes equal to the location or displacement represented by said third signals, and (9) subsequently bringing from storage another block of lead segment data and repeating the steps (2) through (8) with respect thereto.

4. The method defined by claim 3 further characterized in that at least one of said lead segment data blocks represents a desired angular starting location which is greater than the angular ending location of the preceding block, whereby a zero-lead segment is interspersed between two lead segments on the workpiece.

5. The method defined by claim 4 wherein each of the said lead segment blocks represents directly or indirectly a Z axis displacement of the same sign and each represents a desired angular starting location which is greater than the angular ending location of the preceding block, whereby a quasi-helical, "interrupted thread" type of groove is formed on the workpiece.

6. The method defined by claim 5 wherein each of said lead segment data blocks defines an angular extent which is less than 180°.

7. The method defined by claim 6 wherein every one of the lead segment data blocks defines the same angular extent.

8. The method defined by claim 7 wherein the difference between the desired angular starting location defined by one block and the angular ending location defined by the preceding block is equal, viewing each block relative to the preceding block, whereby the workpiece is formed with a plurality of lead segment grooves of equal angular extent separated by zero lead grooves of equal angular extent.

9. The method defined by claim 3 further characterized in that at least some of the lead segment data blocks include representations of a lead ratio and Z axis termination location which collectively define a lead segment less than 360° in angular extent, whereby a plurality of separate lead segments are formed within a 360° span around the workpiece.

10. The method set forth in claim 3 further characterized in that some of said lead segment data blocks contain direct or indirect representations of Z axis displacements which change in sign from block to block.

11. The method set forth in claim 3 further characterized in that alternate ones of said lead segment data blocks contain direct or indirect representations of Z axis displacements of alternate signs, the represented angular starting location for one data block is the same as the ending angular location defined by the preceding data block, and the angular extent of each block is less than 360°, whereby a "wavy" groove is formed in the workpiece.

12. The method set forth in claim 3 further characterized in that the first or the last of said lead segment data blocks includes a direct or indirect numerical representation of a displacement component I to be moved along the X axis, and said step (2) includes, for the first or last block, producing sixth signals (I) representing such X axis displacement, said step (7) includes, for the first or last data block, utilizing said second, fifth and sixth signals to move the cutter along the X axis by a distance ΔX equal to the product ΔZ·(I/K) during each period ΔT.

13. The method of cutting successive but not necessarily contiguous lead segments each of preselectable and predetermined angular location, lead and extent on a workpiece in a turning machine, the machine including means for driving the workpiece relative to a cutter about a rotational axis and means for moving the cutter relative to the workpiece along Z and X axes which lie parallel and normal, respectively, to the rotational axis, said method comprising the steps of (1) storing a plurality of successive lead segment data blocks, each including a representation of (a) a desired angular starting location, (b) a desired lead ratio, and (c) either a desired Z axis termination location or a desired Z axis displacement, (2) bringing from storage, when a given segment is to be executed, the corresponding block data to produce (a) first signals ($\theta$SL) representing the desired angular starting location, (b) second signals (E) representing the desired lead ratio, (c) third signals (ZCEP) representing the desired Z axis ending position, and fourth signals (K) representing the desired Z axis displacement, (3) actuating said rotational driving means on the machine to produce rotation at a selected and generally constant velocity, (4) measuring off successive short equal time periods ΔT, (5) once during each period ΔT and at instants spaced apart by the period ΔT, sensing the angular position of the workpiece relative to the bearing of the cutter, to produce fifth signals ($\theta$APH) representing the then actual angular position of the workpiece, (6) during each period ΔT—at least until detection is made—comparing said first and fifth signals ($\theta$SL and $\theta$APH) to detect when the latter first becomes substantially equal to the former, (7) in response to and after such detection, and during each period ΔT, subtracting the fifth signals ($\theta$APH$_p$) produced during the preceding period ΔT from the current fifth signals ($\theta$APH) to produce sixth signals (Δθ) representing the incremental angle moved by the workpiece in a time span of ΔT, (8) at least after such detection, and during each period ΔT, multiplying said sixth and second signals to create seventh signals (ΔZ) representing incremental moves to be made along the Z axis, (9) at least after such detection and during each period ΔT, incrementing commanded position signals (ZCP) by the amount of said seventh signals (ZCP$_i$=ZCP$_{i-1}$+ΔZ),

(10) utilizing said commanded position signals (ZCP) to actuate the Z axis drive means of the machine with soft servo action to maintain the actual Z axis cutter position substantially in agreement with the value of such signals,

(11) at least after such detection and during each period ΔT, comparing said commanded position signals (ZCP) with said third signals (ZCEP) to indicate when the former approach approximate equality with the latter,

(12) in response to such indication, terminating the execution of said step (9), and

(13) in response to such indication bring from storage the next lead segment data block and repeating steps (2) through (12) with respect thereto.

14. The method set forth in claim 13 further characterized in that at least one of said lead segment data blocks includes a direct or indirect representation of an X axis displacement, said step (2) includes producing eighth signals (I) representing an X axis displacement, further comprising

(14) at least after the said detection in step (6) occurs, utilizing said sixth, seventh and fourth signals to produce ninth signals (ΔX) which, during each period ΔT, are equal to the product ΔZ·(I/K), during each period ΔT,

(15) during each period ΔT, incrementing commanded position signals (XCP) by the amount of the ninth signals ($XCP_i = XCP_{i-1} + \Delta X$), and

(16) utilizing said last-named position signals (XCP) to actuate the X axis drive means of the machine with soft servo action to maintain the actual X axis cutter position substantially in agreement with the value of such signals.

15. In a numerical control system for a turning machine, apparatus for effecting the cutting of a lead segment in the cylindrical surface of a workpiece driven relative to a cutter about a rotational axis (herein called the θ axis) in response to (i) first signals designating the desired θ axis starting location for the segment, (ii) second signals designating the desired lead ratio for the segment, and (iii) third signals designating the Z axis ending location for the segment, said turning machine having servo drive means for moving the cutter relative to the workpiece along X and Z axes which respectively lie normal and parallel to the rotational axis, said apparatus comprising in combination (1) means for measuring off successive equal periods ΔT in actual time, (2) means for producing signals which dynamically represent the θ axis actual position of the workpiece, (3) means responsive to said first and fourth signals for detecting when the θ axis actual position becomes substantially equal to the desired segment starting location, (4) means for producing command signals representing the commanded position of the cutter along the Z axis, (5) means, effective after and as a result of detection by said means (3), and responsive to said second and fourth signals, for changing said command signals during each period ΔT by an amount ΔZ, where ΔZ is during such period proportional to the product of (i) the desired lead ratio, and (ii) the change in the θ axis position which has occurred in the span of one period ΔT, and (6) means for disabling said means for changing said command signals when said command signals become approximately equal to said third signals, and (7) means for actuating said Z axis servo drive means to keep the actual Z axis position of the cutter in agreement with said position command signals.

16. In a numerical control system for a turning machine for carrying out machining on the cylindrical surface of a workpiece driven relative to a cutter about a rotational axis (the rotational position of the workpiece here being called the θ axis), said turning machine including servo drive means for moving said cutter relative to the workpiece along X and Z axes which lie respectively normal and parallel to the rotational axis, said numerical control system including (a) means for measuring off successive, equal periods ΔT in actual time, (b) means for producing first signals (θAP) which dynamically represent the θ axis actual angular position of the workpiece, (c) means for producing second signals (ZCP) representing a commanded position of the cutter along the Z axis, (d) means responsive to said second signals for energizing said Z axis servo drive means to maintain the actual Z axis position of said cutter in substantial agreement with the second signals, (e) means for receiving and storing blocks of part program data signals each including mode code signals, some of said blocks having conventional mode codes (such as G01, G02) and some having a special mode code (e.g., G36) with the special mode blocks resulting in (i) third signals (θSL) representing a desired θ axis starting location for a lead segment, (ii) fourth signals (E) representing a desired lead ratio, and (iii) fifth signals (ZCEP or K) representing a desired Z axis ending position or departure for the lead segment, (f) means responsive to block signals associated with conventional mode codes for effecting relative movements of the cutter and workpiece in the corresponding conventional modes (e.g., linear or circular interpolation), the improvement which comprises in combination (1) means responsive to said first and third signals for detecting when the θ axis actual position becomes substantially equal to the desired angular starting location, (2) means effective only after such detection by said means (1), and responsive to said first and fourth signals for producing, during each period ΔT, sixth signals (ΔZ) which are proportional to the product of (i) said fourth signals and (ii) the amount (Δθ) by which the angular θ axis position of the workpiece has changed in the time span of one ΔT, (3) means responsive to said sixth signals (ΔZ) for incrementally changing said second signals (ZCP) by the amount ΔZ during each period ΔT, and (4) means responsive to said second and fifth signals (ZCP and ZCEP or K) for terminating the changing by said means (3) when the second signals become substantially equal to the fifth signals, whereby any special mode code part program mode results in the cutter moving relative to the workpiece along a lead segment path of predetermined angular starting location, lead ratio, and extent.

* * * * *